United States Patent
Johnson

(10) Patent No.: US 9,378,049 B1
(45) Date of Patent: Jun. 28, 2016

(54) SERVICING I/O REQUESTS IN AN I/O ADAPTER DEVICE

(71) Applicant: Amazon Technologies, Inc., Seattle, WA (US)

(72) Inventor: Robert Michael Johnson, Austin, TX (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/620,764

(22) Filed: Feb. 12, 2015

(51) Int. Cl.
 *G06F 9/455* (2006.01)
 *G06F 9/46* (2006.01)

(52) U.S. Cl.
 CPC ............ *G06F 9/467* (2013.01); *G06F 9/45533* (2013.01)

(58) Field of Classification Search
 CPC ....................................................... G06F 9/467
 USPC ...................................................... 718/1–108
 See application file for complete search history.

(56) References Cited

U.S. PATENT DOCUMENTS

| | | | |
|---|---|---|---|
| 6,298,370 B1 * | 10/2001 | Tang ..................... | G06F 9/5044 718/100 |
| 6,925,641 B1 * | 8/2005 | Elabd ..................... | G06F 9/505 710/1 |
| 7,992,144 B1 * | 8/2011 | Hendel .................. | G06F 9/5077 709/250 |
| 2008/0320476 A1 * | 12/2008 | Wingard .............. | G06F 12/0607 718/101 |
| 2009/0055826 A1 * | 2/2009 | Bernstein .............. | G06F 9/3891 718/102 |

OTHER PUBLICATIONS

Tzeng, Stanley, Anjul Patney, and John D. Owens. "Task management for irregular-parallel workloads on the GPU." Proceedings of the Conference on High Performance Graphics. Eurographics Association, 2010, pp. 29-37.*
Ridenour, Jason, et al. "Low-power buffer management for streaming data." Circuits and Systems for Video Technology, IEEE Transactions on 17.2 (2007): pp. 143-157.*
Kornaros, George, et al. "Pipelined multi-queue management in a vlsi atm switch chip with credit-based flow-control." Advanced Research in VLSI, 1997. Proceedings., Seventeenth Conference on. IEEE, 1997, pp. 127-144.*
U.S. Appl. No. 14/671,800, filed Mar. 27, 2015, Titled: Payload Checksum Interval.
U.S. Appl. No. 14/672,658, filed Mar. 30, 2015, Titled: Low Latency Write Requests.
U.S. Appl. No. 14/673,474, filed Mar. 30, 2015, Titled: Streaming Interconnect Architecture.
U.S. Appl. No. 14/750,926, filed Jun. 25, 2015, Titled: Data Size Reduction.

* cited by examiner

*Primary Examiner* — Satish Rampuria
(74) *Attorney, Agent, or Firm* — Kilpatrick Townsend & Stockton LLP

(57) ABSTRACT

Server computers may include one or more input/output (I/O) adapter devices for communicating with a network and/or direct-attached device. The I/O adapter device may have limited physical resources, such as memory. Large I/O transactions may occupy all available memory on the I/O adapter device, thus causing other I/O transactions to experience intermittent and excessive delays. The I/O adapter device can be configured to issue one or more transactions for a large I/O request. Each transaction transfers a portion of the data requested by the large I/O request. When all the transactions have completed, the client that requested the large I/O request is informed that the I/O request has completed.

20 Claims, 15 Drawing Sheets

US 9,378,049 B1

SERVICING I/O REQUESTS IN AN I/O ADAPTER DEVICE

BACKGROUND

Server computers often include one or more input/output (I/O) devices. For example, a server computer may include one or more I/O adapter devices for communicating with a network and/or direct-attached storage device. Each I/O device may communicate over multiple, possibly asynchronous interfaces, such as PCI Express (PCIe) and/or Ethernet. For example, a host server computer may send I/O transactions over a PCIe bus to the I/O adapter device, and the I/O adapter device may send those I/O transactions over an Ethernet cable for processing by another server.

The physical resources of the I/O adapter device, however, may be limited. For example, the I/O device may have a limited amount of fast memory for storing an I/O transaction being processed by the I/O device. Thus several or even as few as one I/O transaction may occupy all available memory on the I/O adapter device, causing congestion and delay in the processing of the I/O transactions.

Moreover, congestion and delay, due to limited physical resources on the I/O adapter device, may be further exacerbated in I/O devices implementing virtualized interfaces. An I/O adapter device may implement a virtualized interface, such as for example Single Root I/O Virtualization (SR-IOV). A virtualized interface allows the I/O adapter device to present itself as multiple virtual devices to the host server computer. Virtual machines running on the host server computer may then use a virtual device on the I/O adapter device as if the virtual device were a physical device. When multiple virtual machines attempt to use the I/O adapter device, they may experience intermittent and excessive delays.

BRIEF DESCRIPTION OF THE DRAWINGS

Various embodiments in accordance with the present disclosure will be described with reference to the drawings, in which.

DETAILED DESCRIPTION

Figure 1:
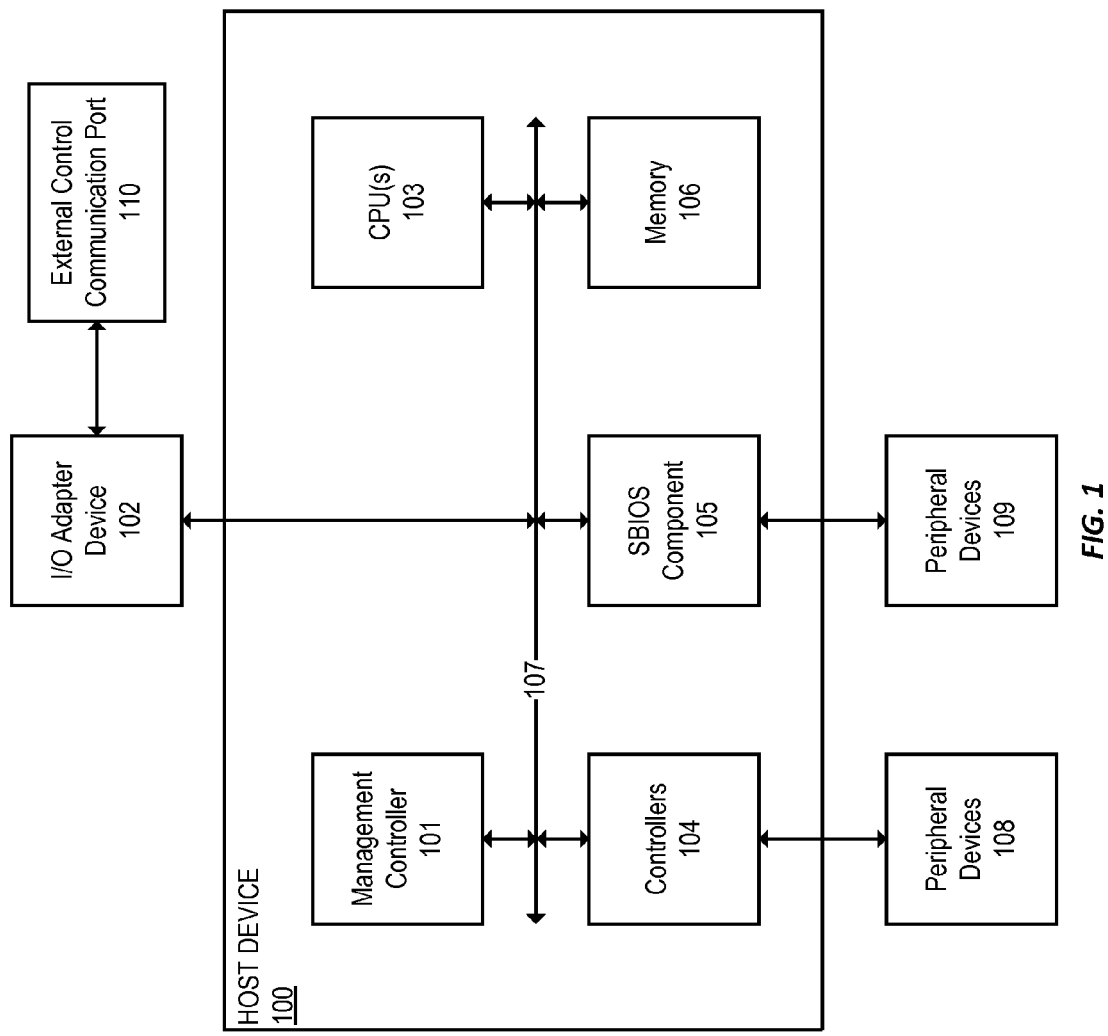
FIG. 1 shows a host device including an I/O adapter device according to one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Server computers often have a need to perform tasks outside the environment of the CPU and main memory (i.e., RAM). For example, the server may need to communicate with external entities (e.g., other servers) or process data using an external processor (e.g., a General Purpose Graphical Processing Unit (GPGPU)). In such cases, the CPU may interface with one or more I/O devices. In some cases, these I/O devices may be special-purpose hardware designed to perform a specific role. For example, an Ethernet network interface controller (NIC) may be implemented as an application specific integrated circuit (ASIC) comprising digital logic operable to send and receive packets.

Techniques are described herein for managing large input/output (I/O) requests in an I/O adapter device, where the I/O adapter device has limited memory and/or is servicing I/O requests from multiple sources. For example, the I/O adapter device may include 6 MB of fast SRAM, while I/O requests may require the transfer of 1 MB of data or more; hence, after six or fewer I/O requests, the I/O adapter device may not be able to service any more I/O requests. As another example, a host device with which the I/O adapter device is communicating may be hosting multiple virtual machines, and the I/O adapter device may be emulating multiple virtual devices. The virtual machines may each be treating a virtual device as if it has exclusive use of the virtual device. Thus, just a few large I/O requests from one virtual machine may monopolize all of the physical resources of the I/O adapter device, causing other virtual machines to experience intermittent and excessive delays in having their I/O requests serviced by the I/O adapter device. In a further example, each virtual machine may be maintaining multiple queues of I/O requests. Several large I/O requests from a single queue may occupy all of the I/O adapter device's resources, thus causing the other queues to be delayed.

To more fairly and efficiently utilize the I/O adapter device's resources, the I/O adapter device may, in various embodiments, segment large I/O requests into smaller I/O transactions, issue each of the smaller I/O transactions, and upon completion of each of the smaller I/O transactions return a single response for the large I/O request. For example, a large write request may be segmented into multiple smaller write transactions, where each of the multiple write requests include only a portion of the write data. The I/O adapter device may generate and transmit each smaller write request one at a time, and thus the I/O adapter device only needs to store a small portion of the write data at a time. Similarly, a large read request may be segmented into multiple smaller read transactions. As each of the smaller read transactions is responded to, the data in the response is returned to the requesting client; once all the responses have been received, the requesting client is informed that the read is complete. Thus for a read request the I/O adapter device will only need to store a portion of the read data at any given time.

I. Systems

FIG. 1 shows a host device 100 in communication with an I/O adapter device 102 according to one embodiment. However, one skilled in the relevant art will appreciate that the disclosed illustrative components are not meant to be an exhaustive identification of all the components required by or present in a host device 100. Rather, illustrative components have been identified, in a non-limiting manner, to facilitate illustration of one or more aspects of the present application. Still further, the illustrative components of the host device 100 can be considered logical in nature such that the physical implementation of one or more components can be varied or such that one or more of the logical components may be implemented in a virtualized manner. Additionally, one or more host devices 100 can share one or more of the illustrated components, such as processors, graphical processing units, memory and the like.

In an illustrative embodiment, the host device 100 is associated with various hardware components, software components and respective configurations that facilitate the execution of large I/O requests, which will be described in detail below. Specifically, in one embodiment, host device 100 can include a management controller 101 for managing the operation of host device 100 in accordance with the Intelligent Platform Management Interface ("IPMI"). Specifically, the management controller 101 can include an embedded microcontroller that manages the interface between system management software and host device 100 components.

In communication with the host device 100 is an I/O adapter device 102. Generally, the I/O adapter device 102 may include any device that inputs and/or outputs data along a communication channel 107. In one aspect, the I/O adapter device 102 can communicate as a standard bridge component for facilitating access between various physical and emulated components and a communication channel 107. In another aspect, the I/O adapter device 102 can include embedded microprocessors to allow the I/O adapter device to execute computer executable instructions related to the implementation of management functions or the management of one or more such management functions, or to execute other computer executable instructions related to the implementation of the I/O adapter device 102. In some embodiments, the I/O adapter device 102 may be implemented using multiple discrete hardware elements, such as multiple cards or other devices. The management controller 101 can be configured in such a way to be electrically isolated from any other component in the host device 100 other than the I/O adapter device 102. In some embodiments, the I/O adapter device 102 is attached externally to the host device 100. In some embodiments, the I/O adapter device 102 is internally integrated into the host device 100.

Also in communication with the I/O adapter device 102 may be an external communication port component 110 for establishing communication channels between the host device 100 and one or more network based services or other network-attached or direct-attached computing devices. Illustratively, the external communication port component 110 can correspond to a network switch, sometimes known as a Top of Rack ("TOR") switch. The I/O adapter device 102 can utilize the external communication port component 110 to maintain communication channels between one or more services and the host device 100, such as health check services, financial services, and the like.

The I/O adapter device 102 can also be in communication with a System Basic Input/Output System (SBIOS) component 105. The SBIOS component 105 can include non-transitory executable code, often referred to as firmware, which can be executed by one or more processors and used to cause components of the host device 100 to initialize and identify system devices such as the video display card, keyboard and mouse, hard disk drive, optical disc drive and other hardware. The SBIOS component 105 can also include or locate boot loader software that will be utilized to boot the host device 100. For example, in one embodiment, the SBIOS component 105 can include executable code that, when executed by a processor, causes the host device 100 to attempt to locate Preboot Execution Environment (PXE) boot software. Additionally, the SBIOS component 105 can include or takes the benefit of a hardware latch that is electrically controlled by the I/O adapter device 102. The hardware latch can restrict access to one or more aspects of the SBIOS component 105, such controlling modifications or configurations of the executable code maintained in the SBIOS component 105.

The SBIOS component 105 can be connected to (or in communication with) a number of additional computing device resources components, such as central processing units ("CPUs") 103, memory 106 (e.g., RAM), and the like. In one embodiment, such computing device resource components may be physical computing device resources in communication with other components via the communication channel 107. The communication channel 107 can correspond to one or more communication buses, such as a shared bus (e.g, a front side bus, a memory bus), a point-to-point bus such as a PCI or PCI Express bus, etc., in which the components of the bare metal host device 100 communicate. Other types of communication channels, communication media, communication buses or communication protocols (e.g., the Ethernet communication protocol) may also be utilized. Additionally, in other embodiments, one or more of the computing device resource components may be virtualized hardware components emulated by the host device 100. In such embodiments, the I/O adapter device 102 can implement a management process in which a host device is configured with physical or emulated hardware components based on a variety of criteria. The computing device resource components may be in communication with the I/O adapter device 102 via the communication channel 107. In addition, although communication channel 107 in FIG. 1 is shown as connecting all of components 101-106, it should be appreciated that a communication channel in accordance with some embodiments may connect any subset of the components 101-106 and/or other components. For example, a communication channel may connect a PCI Express device to a CPU via a northbridge or host bridge.

Also in communication with the I/O adapter device 102 via the communication channel 107 may be one or more controller components 104 for managing hard drives or other forms of memory. An example of a controller component 104 can be a SATA hard drive controller. Similar to the SBIOS component 105, the controller components 104 can include or take the benefit of a hardware latch that is electrically controlled by the I/O adapter device 102. The hardware latch can restrict access to one or more aspects of the controller component 104. Illustratively, the hardware latches may be controlled together or independently. For example, the I/O adapter device 102 may selectively close a hardware latch for one or more components based on a trust level associated with a particular customer. In another example, the I/O adapter device 102 may selectively close a hardware latch for one or more components based on a trust level associated with an author or distributor of the executable code to be executed by the I/O adapter device 102. In a further example, the I/O adapter device 102 may selectively close a hardware latch for one or more components based on a trust level associated with the component itself.

The host device 100 can also include additional components that are in communication with one or more of the illustrative components associated with the host device 100. Such components can include devices, such as one or more controllers 104 in combination with one or more peripheral devices 108, such as hard disks or other storage devices. Additionally, the additional components of the host device 100 can include another set of peripheral devices 109, such as Graphics Processing Units ("GPUs"). The peripheral devices 108 and 109 can also be associated with hardware latches for restricting access to one or more aspects of the component. As mentioned above, in one embodiment, the hardware latches may be controlled together or independently.

Figure 2:
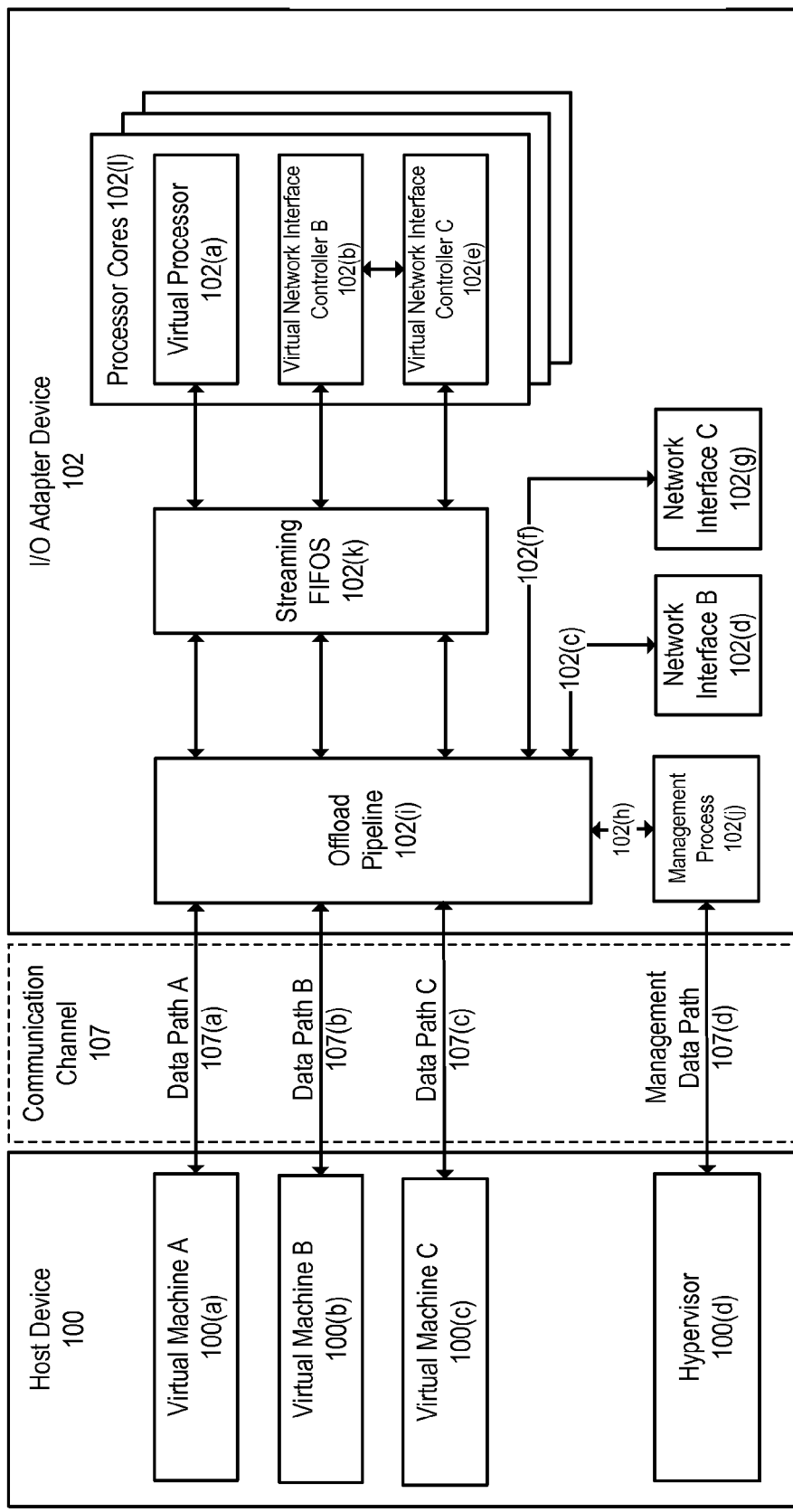
FIG. 2 shows a block diagram illustrating communication between a CPU and an I/O adapter device according to some embodiments.

As shown in FIG. 2, the host device 100 may execute a plurality of processes, such as a virtual machines A-C 100(a)-(c) and a hypervisor 100(d). The I/O adapter device 102 may include an offload pipeline 102(i) for receiving and handling requests from the virtual machines 100(a)-(c). The I/O adapter device 102 may also include one or more processor cores 102(l). The I/O adapter device 102 may emulate a plurality of devices using the processor cores 102(l), such as virtual processor 102(a), and virtual network interface cards 102(b) and 102(e). I/O adapter device 102 may also include a management process 102(h). Each of the above-described components of the host device 100 and the I/O adapter device 102 may communicate using data paths 107(a)-(d) over communication channel 107.

Virtual machine A 100(a) may be any suitable emulation of a computer system. Virtual machine A 100(a) may be in communication with a virtual processor 102(a) via a data path A 107(a). The virtual processor 102(a) may include one or more processing elements such as microprocessors. For example, the virtual processor 102(a) may include a general purpose graphical processing unit (GP-GPU), an application-specific instruction-set processor (ASIP), or another specialized processing element that may be better suited for certain tasks (e.g., secure billing and transaction processing) than the host device 100.

Virtual machine B 100(b) may also be any suitable emulation of a computer system. Virtual machine B 100(b) may be in communication with a virtual network interface controller (NIC) B 102(b) via the data path B 107(b). The network interface B 102(d) may be any suitable interface to a computer network. In one example, the network interface B 102(d) may be a physical Ethernet port. In another example, the network interface B 102(d) may be a virtual network interface that shares the same physical Ethernet port with one or more other virtual network interfaces. Virtual machine C 100(c) may similarly be in communication with the network interface C 102(g).

The virtual machines 100(a)-(c) running on the host device 100 may be managed by a hypervisor 100(d). The hypervisor 100(d) may, for example, be configured to create, start, monitor, stop, and delete virtual machines 100(a)-(c). In addition, the hypervisor 100(d) may be configured to communicate with a management process 102(g) on the I/O adapter device 102 via a management data path 107(d). The management process 102(g) may be used to, for example, create or remove virtual devices such as the virtual offload processor 102(a), the virtual NIC B 102(b), and/or the virtual NIC C 102(e) and manage an offload pipeline 102(i) via an offload pipeline interface 102(h).

The virtual machines 100(a)-(c) may be assigned priorities. Priorities mean that the transactions initiated by one virtual machine 100(a) may take precedence over transactions initiated by another virtual machine 100(b). In some embodiments, the priorities may only take effect when the resources of the I/O adapter device 102 are heavily occupied. Priorities may take the form of service level agreements. A service level agreement may, for example, indicate an amount of resource usage permitted to a virtual machine 100(a)-(c). For example, service level agreements may indicate that a virtual machine 100(a)-(c) may only be allowed a certain amount of network bandwidth, host memory, and/or I/O adapter device 102 usage. I/O adapter device 102 usage may involve assigning a certain amount of buffer memory space to each virtual machine; thus, for example, service level agreements may indicate how much buffer memory space a virtual machine 100(a)-(c) is assigned.

Priorities may also apply to queues maintained by virtual machines 100(a)-(c). For example, in embodiments where the I/O adapter device 102 implements the Non-Volatile Memory Host Controller Interface Specification (NVMHCI, also called NVM Express or NVMe), a virtual device 102(a), (b), (e) may provide multiple queues, such as for example paired submission and completion queues. Commands are placed by the virtual machine into a submission queue. Completions for those commands are placed in the associated completion queue. In some instances, the virtual device 102 (a), (b), (e) may provide multiple submission queues. Priorities may be assigned to specific queues, or to specific queue pairs, such that transactions in one queue may take precedence over transactions in another queue. In some embodiments, priorities may not take effect until the I/O adapter device's 102 resources are heavily occupied.

Requests from the virtual machines 100(a)-(c) may be received and handled in the I/O adapter device 102 by an offload pipeline 102(i). The offload pipeline 102(i) may include a pipeline with individual units or streaming components for managing the steps to prepare and issue the requests to the network interfaces 102(d), 102(g). The offload pipeline 102(i) may also include buffer memory for intermediate storage of data associated with requests from the virtual machines 100(a)-(c). The offload pipeline 102(i) may communicate with the processor cores 102(l) and/or virtual devices 102(a), 102(b), 102(e) running on the processor cores 102(l) over one or more streaming FIFOs 102(k). In some instances, the offload pipeline 102(i) provides a fast path for servicing certain requests with lower complexity or certain aspects of the request with respect to the processor cores 102(l) executing on the I/O adapter device.

It should be noted that although certain virtual devices are shown as part of the I/O adapter device 102 of FIG. 2 (i.e., virtual processor 102(a) and virtual network interface cards B 102(d) and C 102(g)), embodiments may generally relate to any suitable virtual or physical I/O device. In addition, although in FIG. 2 virtual machines 100(a)-(c) and virtual devices 102(a), 102(b) and 102(e) have a one-to-one correspondence, in various embodiments a virtual machine may be associated with zero, one, or multiple virtual devices on an I/O adapter device. Furthermore, although FIG. 2 is described with reference to a plurality of virtual machines running on host device 100, it should be noted that in some embodiments host device 100 may run a single, non-virtualized operating system.

II. Write Requests

Figure 3:
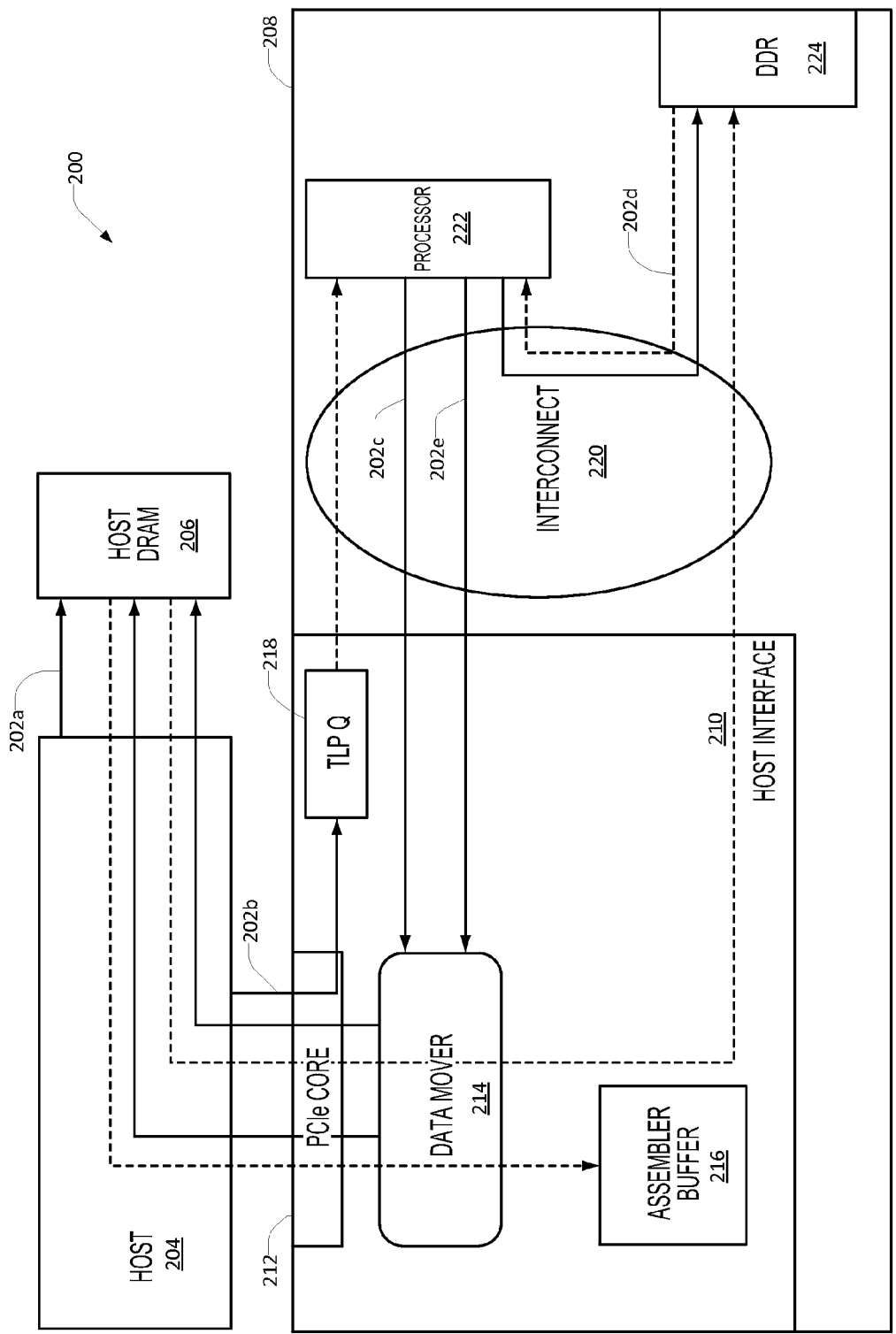
FIG. 3 illustrates one embodiment of a system for implementing a storage write request, and the steps to execute the write request.
Figure 4:
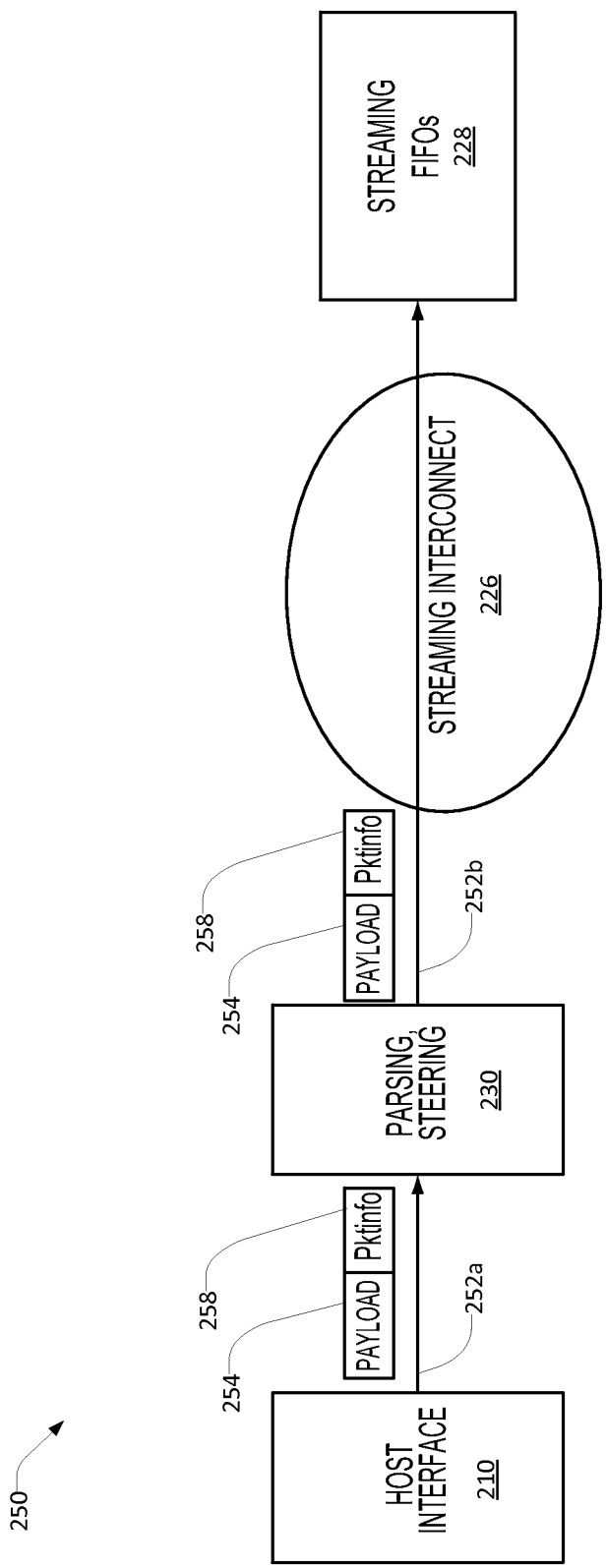
FIG. 4 illustrates on embodiment of a packet flow for moving the write request described in FIG. 3 from the host interface in the I/O adapter device to the I/O adapter device's offload pipeline, and then out to the network.
Figure 5:
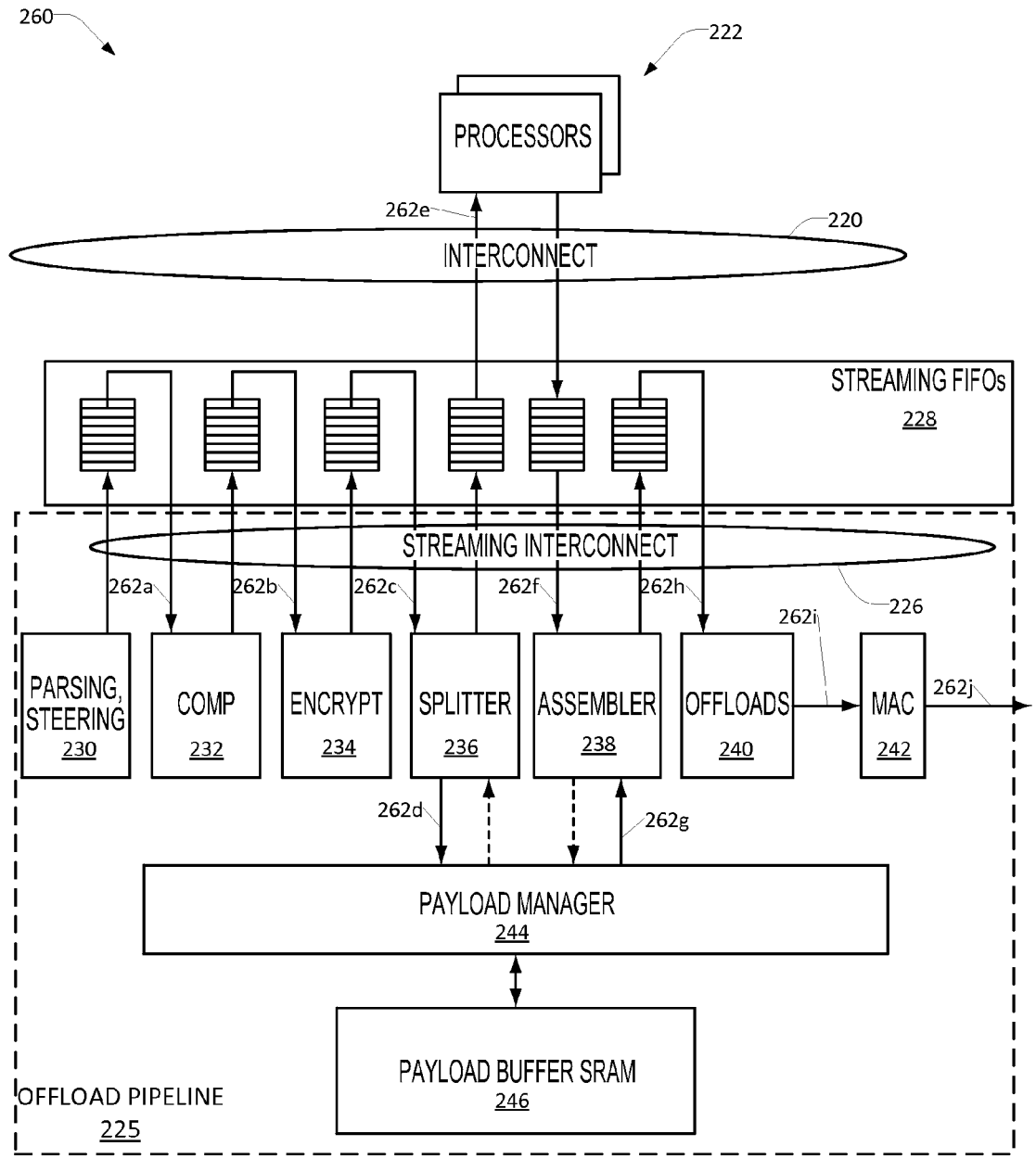
FIG. 5 illustrates one embodiment of the flow of the write request packet through the offload pipeline in the I/O adapter device.

FIGS. 3-7 illustrate one embodiment of how a large storage write request is handled, including how the write request is segmented into smaller write transactions. These figures illustrates how a write request is transferred from a virtual machine on a host device to an I/O adapter device (FIG. 3), where the I/O adapter device segments the large write request into smaller write transactions. The smaller write transactions are each transferred from the host interface in the I/O adapter device to the I/O adapter device's offload pipeline (FIG. 4). Each of the smaller write transactions flow through the offload pipeline, where they are processed and sent to a storage device (FIG. 5). Each of the smaller write transactions will receive a response from the storage device; these responses also flow through, and are processed by, the offload pipeline (FIG. 6), and once all the write transactions have been issued and responded to the I/O adapter device informs the virtual machine that the write request has completed.

FIG. 3 illustrates one embodiment of a system 200 for implementing a storage write request, and the steps to execute the write request, where the write request may be targeted to a storage device. The storage device may comprise, for example, a remote computing device, a network-attached storage device, and/or a direct-attached storage device. Direct-attached storage devices include storage devices directly attached to the host device. The write request is transferred from a virtual machine on a host device 204 to an I/O adapter device 208. In some instances, the write request originates from a virtual machine executing on the host device 204. The I/O adapter device processes the write through an offload pipeline, and sends the write through a network interface port. The network interface port can be, for example, a 10 Gb, 25 Gb, or 50 Gb port or any other high data bandwidth interface port.

Write requests can range in size, for example, from 4 KB to 128 KB, to as large as 4 MB to 16 MB. The storage available in the I/O adapter device, however, may be, for example, only 6 MB. To eliminate intermittent periods of delay between virtual devices on the I/O adapter device 208 and the virtual machine instances on the host 204, and to avoid storing large write requests on the I/O adapter device 208, the I/O adapter device 208 can be configured with a maximum write burst size. In certain embodiments, the maximum write burst size can apply to all write requests, and/or can be specified for each individual virtual device on the I/O adapter device 208, and/or can be specified for each individual write request. In certain implementations, the maximum write burst size can be used by the I/O adapter device 208 to divide a large write request into multiple smaller write transactions, where each of the smaller write transactions contains only as much write data as the write burst size. The I/O adapter device 208 will thus only need to store the smaller, partial write data segments at any given time, thus freeing the I/O adapter device's 208 resources for other use. A write response may be received over a network interface port. The response may be processed by an offload pipeline in the I/O adapter device 208, and a completion message may be sent to the virtual machine that requested the write. I/O adapter device 208 will send the completion message only when all of the smaller write transactions have been responded to (except in possible situations where an error may have occurred). The virtual machine that requested the write will thus not be aware that the large write request was segmented into smaller write transactions.

FIG. 3 illustrates one embodiment of the steps by which a write request may be transferred from a virtual machine on a host device 204 to an I/O adapter device 208. In some embodiments, the communication channel between the host 204 and the I/O adapter device takes the form of a PCIe interface; in such embodiments, the host interface 210 may include a PCIe core 212. It is understood that a PCIe interface is only given as an example, and that, as explained above, the communication channel can be implemented in other forms.

As a first step, the virtual machine on the host 204 posts 202a the write request by writing the write data to a buffer in host DRAM 206. The virtual machine may also write other information about the write request to host DRAM 206, such as a packet descriptor, indicating where in the host DRAM 206 the write data is located.

As a second step, the virtual machine on the host 204 will notify 202b the I/O adapter device 208 that it wishes to execute a write. In embodiments where the I/O adapter device 208 communicates with the host 204 over a PCIe communication channel, the I/O adapter device 208 implements a PCIe core 212 in its host interface 210. In such embodiments the notification 202b may take the form of a doorbell write. The doorbell write is steered to a Transaction Layer Packet (TLP) queue 218 that is associated with a processor 222 that is designated for processing transactions for the virtual machine. In some embodiments, the I/O adapter device contains one or more processors 222, which may be assigned to specific tasks. One such task may be to handle requests or specific types of requests from a specific virtual machine. Individual processors 222 may be implemented as ARM cores, as illustrated. The processors 222 communicate with the host interface 210 through an interconnect 220. In some embodiments, such as embodiments in which the processors 222 are implemented as ARM cores, the interconnect 220 can be an AXI interconnect.

At this step, designated processor 222 may determine that the write request is larger than a pre-determined size. When the write request is larger than the pre-determined size, the processor 222 may segment the write request into multiple write transactions, as previously described. The pre-determined size can be configured by software, and can be stored in software and/or in a hardware register. Each write transaction will transmit only as much data as a pre-determined burst size. The pre-determined burst size may be an arbitrary size or may be based on the size of the storage buffers and various caches on the I/O adapter device 208, the bandwidth or latency of various hardware logic and paths, the average size of the write requests, the service level agreements associated with specific virtual machines or transfer size specified by a network protocol. For example, the network protocol may specify a maximum transfer unit (MTU), which can be, for example, as small as 1500 bytes to as large as 9000 bytes. In some instances, the burst size may be pre-configured but dynamic, such that the burst size may be altered based on various metrics related to the current I/O load (e.g., network load) being handled by the I/O adapter device 208 at any given point in time.

In some embodiments, a write transaction may be further segmented into yet smaller write transactions. This may occur when the pre-determined burst size is larger than a pre-determined frame size. The pre-determined frame size may be, for example, the maximum size of a network frame, as defined by a given network protocol. Alternatively, the frame size may be configured by software, or may be given by a hardware or firmware configuration. In such embodiments, a write transaction whose data is larger than the frame size may be segmented into one or more frame-size write data segments, where each frame-size write data segment includes equal to or less than a frame-size data. Each of these frame-size write data segment will be transmitted to the network. In some embodiments, the network will return a response only for the write transaction that generated the frame-size write data segments. In some embodiments, the network may return a response for each of the frame-size write data segments.

The following steps describe the process of generating and transmitting the multiple write transactions and/or multiple frame-size write transactions. Any of these write transactions may include transmission of one or more frame-size write data segments. Each of these write transactions write a portion of the data of the initial write request received from the virtual machine on the host. Similarly, each frame-size write data segment may write an even smaller portion of the data. In certain scenarios, where the data size of the write request is smaller than the pre-determined burst size, a single transaction may be generated for the initial write request. Even in such scenarios where the data size of the write request is smaller than the pre-determined burst size, in certain implementations similar steps may be followed as described below.

As a third step, the designated processor 222 may program 202c a data mover 214 to fetch information for the write request from the host DRAM 206. For example, the data mover 214 may fetch the packet descriptor, which indicates where in the host DRAM 206 the write data is located. In some embodiments, the processor 222 may have pre-fetched the packet descriptors, and thus not need to fetch the packet descriptors at this stage.

As a fourth step, the designated processor 222 may read 202d descriptor information from DDR 224 on the I/O adapter device 208. The descriptors stored in the DDR 224 include information about the write request. For example, the descriptors may include the request type, the size of the data to be transferred by the request, where the host DRAM 206 the data is located, and/or where in the I/O adapter's payload buffer the data may be temporarily stored. Descriptors may be placed in the DDR 224 when the write request is initially sent to the I/O adapter device and is added by the I/O adapter to a list requests to be handled. For example, the write request may be added to a submission queue. The descriptor information may indicate that more descriptors should be fetched from the host DRAM 206.

As a fifth step, the designated processor 222 may program 202e the data mover 214 to read the write data from the host DRAM 206 for the write transaction and, in some embodiments, write the data to an assembler buffer 216. The host interface 210 may, for example, issue a direct memory access (DMA) transaction to transfer the write data. The assembler buffer 216 is a memory that serves as a temporary buffer to assemble packets that need to be sent to the offload pipeline. As noted above, this DMA transaction may only transfer a portion of the write data, thus avoiding excessive usage of the I/O adapter device's 208 resources. In some embodiments the assembler buffer may be located in another unit, such as for example in the payload manager 244, described below. Some embodiments do not include the assembler buffer 216, and the DMA transaction transfers the write data to a payload buffer 246, described below. As explained above, the write data comprises only a portion of the data for the initial write request. Hence, the designated processor 222 may maintain a list of locations from which the write data is to be fetched, or may maintain a pointer, or employ some other mechanism to track which portions of the complete write data have been fetched and which have not. In some embodiments, the designated processor 222 may store this information in the DDR 224.

The designated processor 222 may also program the data mover 214 to add packet information ("PktInfo") to the write data. The packet information may include information about the write, such as the identity of the virtual machine that requested the write and information about the storage device to which the write is directed.

FIG. 4 illustrates one embodiment of a packet flow 250 for moving the write transactions described above from the host interface 210 to the I/O adapter device's 208 offload pipeline 225, and then out to the network. The write transactions illustrate here are the smaller write transactions generated when the I/O adapter device 208 segments a large I/O write request into multiple smaller write transactions.

First, the host interface 210 may send a packet, containing the PktInfo 258 and packet payload 254, to a packet parsing and steering 230 unit. The packet payload 254 contains the write data fetched from the host DRAM 206, where the write data may comprise a portion of the requested data to be written, as described above. The data mover 214 in the host interface 210 may also perform a process called "zero block remove" on the payload 254. Zero block remove is a process by which data blocks of an identified type are removed from the payload 254. For example, the identified type may be all zero, and data blocks containing all zeroes will be removed from the payload 254, thus reducing the amount of data to be sent. Data blocks may be, for example, 4 KB in size. When zero block remove has been performed on the payload 254, the PktInfo 258 may be updated with a zero block bitmap to indicate which data blocks (if any) have been removed from the payload 254.

The parsing and steering unit 230 will next send the PktInfo 258 and packet payload 254 to a designated streaming FIFO 228 by way of a streaming interconnect 226. In some embodiments, the parsing and steering unit 230 may also initiate pre-fetching of a context for the virtual machine that initiated the write request. Streaming FIFOs 228 are described in further detail below.

FIG. 5 illustrates one embodiment of the flow 260 of the write transaction packet through the offload pipeline 225 in the I/O adapter device 208. The offload pipeline 225 may be implemented as a combination of software and hardware. The offload pipeline 225 is illustrated here, by way of example, as including a number of streaming components, such as a parsing and steering 320 unit, a compression 232 unit, an encryption 234 unit, a splitter 236 unit, an assembler 238 unit, a network offloads 240 unit, a media access control (MAC) 242 unit, a payload manager 244, and a payload buffer 246. In some implementations, such streaming components may be implemented using hardware logic, such as ASIC, Field programmable Gate Arrays (FPGA) or similar digital hardware components that allow for some configurability enabled through one or more software interfaces. In some implementations, several streaming components may be included in hardware logic as subunits in the same SOC. The offload pipeline 225 may include additional units not illustrated here, as necessary for other operations. In some embodiments, streaming FIFOS 228 enable passing of data between the units of the offload pipeline 225 and between the offload pipeline 225 and one or more processors 222. Software executed by the processors 222 may operate on the data. In some embodiments, the units of the offload pipeline 225 communicate with the streaming FIFOs 228 by way of a streaming interconnect 226. In some embodiments, the units or the streaming components of the offload pipeline 225 communicate with each other through the streaming interconnect 226, and to the processors 222 through the streaming FIFOs, by way of the streaming interconnect 226. In some implementations, the streaming components are configured to perform one or more packet processing operations for the I/O adapter device and the streaming interconnect is configured for routing the one or more transactions through the offload pipeline. The processors 222 communicate with the streaming FIFOs 228 through a separate interconnect 220. The operation of the offload pipeline 225 can be modified and adapted by modifying the software executed by the processors 222.

As explained above with reference to FIG. 4, and as illustrated in FIG. 5, the parsing and steering unit 230 directs the write packet to a streaming FIFO 228. From the streaming FIFO 228, the write packet's PktInfo and payload are passed 262a to a compression 232 unit. The compression 232 unit may compress the payload. The compression 232 unit may then pass 262b the PktInfo and compressed payload to an encryption 234 unit through another streaming FIFO 228. The encryption 234 unit may encrypt the payload; for example, the encryption 234 unit may include a flow based Advanced Encryption Standard-XEX-TCB-CTS (AES-XTS) encryption engine. The encryption 234 unit may pass 262c the PktInfo and encrypted payload to a splitter 236 unit, by way of another streaming FIFO 228. The splitter 236 unit may request 262d payload buffer space from a payload manager 24f. The splitter 236 unit will place the write data payload in the payload buffer 246 at the designated space. The payload manager 244 may return a handle to the payload buffer 246. The splitter 236 unit may place the handle in the PktInfo and send 262e the PktInfo through a streaming FIFO 228 to a processor 222.

The processor 222 may perform protocol processing on the PktInfo, such as for example any necessary processing to prepare the write packet for transmission by a specific network protocol. The processor 222 may create a packet header for the write transaction, where the packet header contains any necessary network protocol information. The processor 222 may also update the PktInfo with information that the network offloads 240 unit will use to generate an error correction value, such as a checksum or cyclic redundancy check (CRC), for the packet header and/or packet payload. The processor 222 may pass 262f the PktInfo and packet header for the write transaction to an assembler 238 unit, by way of a streaming FIFO 228.

The assembler 238 unit requests 262g the packet payload from the payload manager 244 and merges the payload with the PktInfo and the header. The buffer space used by the payload data is freed for other use. The assembler 238 passes 262h the packet, by way of a streaming FIFO 228, to the network offloads 240 unit. The network offloads unit 240 may perform stateless operations on the packet header and/or data, such as for instance checksum generation, UDP/IP checksum generation, and/or Ethernet CRC generation.

As described herein, embodiments may enable stateless operations on the portions of the write requests originating from a virtual machine host. "Stateless" here means that the network offloads 240 unit does not need to maintain state information between the individual write transactions sent for the large write request. For example, since the write data spans multiple write transactions, an error correction value may be generated for each write data segment corresponding to each individual write transaction, instead of generating a single error correction value for the entire write data. A single error correction value would require maintaining the error correction state between write transactions. Doing so may require additional hardware and/or software, or additional processing by the processors 222. In some embodiments, however, the I/O adapter device 208 may nevertheless be configured to generate a single error correction value. In other embodiments, whether to generate a one or multiple error correction values may be determined per request, per virtual device, per virtual machine, and/or per queue, depending on how the I/O adapter device 208 is configured. Any method may be employed to generate the error correction value; hence the error correction value may be, for example, a CRC or a checksum.

The network offloads 240 unit will remove the PktInfo from the packet, and send 262i the now completed packet to a MAC 242 unit for transmission 262j on a network.

Figure 6:
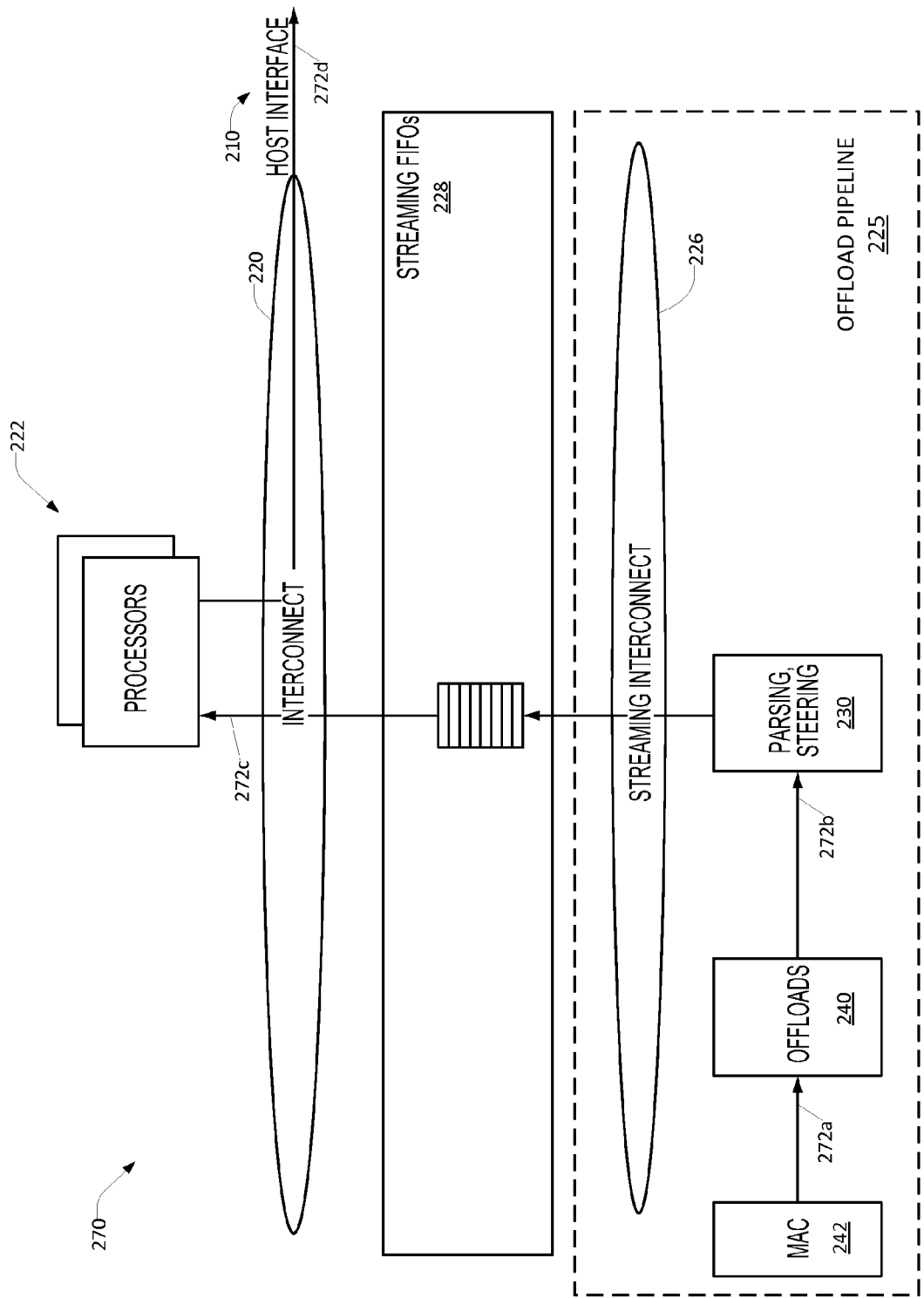
FIG. 6 illustrates one embodiment of the flow of a write response through the offload pipeline of the I/O adapter device.

FIG. 6 illustrates one embodiment of a flow 270 of a write response for a write transaction through the offload pipeline 225 of the I/O adapter device 208. The offload pipeline 225 is illustrated here, by way of example, as including a MAC 242 unit, a network offload 240 unit, and a parsing and steering 230 unit. The offload pipeline 225 may include additional units not illustrated here, as necessary for other operations. The write response will be sent by the network device to which the write request was directed, to indicate that the write has completed. In some cases, the write response may indicate that an error occurred. In such cases, the processor 222 may examine the error and determine what, if anything, to do. In some cases, the processor 222 may inform the virtual machine that requested the write that an error occurred. In other cases, the processor 222 may handle the error and/or re-issue the entire write request, including resending each of the smaller write transactions. In other cases, the processor 222 may resend only the write transaction for which an error was received, without reissuing the all the write transactions associated with the write request.

The flow 270 illustrated in FIG. 6 gives an example of a write response indicating that the write was successful. The write response for the write transaction is first received from the network at the MAC 242 unit. The MAC 242 unit passes 272a the packet to the network offloads 240 unit. The network offloads 240 unit may perform stateless operations on the packet, such as for instance checking an Ethernet CRC, IP or UDP checksum, or other checksum in the packet. Any results of the stateless operations may be added to a PktInfo that is generated for the packet. The network offloads 240 unit passes 272b the packet to the parsing and steering 230 unit.

The parsing and steering 230 unit parses the packet header and may determine that the packet should be routed to a particular processor 222 that is associated with ingress traffic. The parsing and steering unit 230 will therefore place the packet header and PktInfo in a streaming FIFO 228, from which it will be passed 272c to the designated processor 222. In some embodiments parsing and steering 230 unit may also start pre-fetching a context state for the virtual machine that requested the write.

The designated processor 222 may process the packet header and PktInfo. For example, the designated processor 222 may perform protocol processing, such as network protocol processing, using the packet header, PktInfo, and context, as well as any other information that was attached to the write transaction. The processor 222 will inform the virtual machine that request the write that the write was complete only when all the write transactions have been issued and responses have been received for each. In some embodiments, the processor 222 will maintain a list, or pointer, or some other mechanism to determine when all the write transactions have been issued and responded to. Once all the write transactions have been issued and responded to, the processor 222 may issue 272d a completion request to the host interface 210. The completion request contains sufficient information for the host interface 210 to inform the virtual machine that requested the write that the write completed successfully. From the virtual machine's perspective, it is unaware that multiple write transactions were sent for the one write request it made.

As can be seen from the above description, segmenting large write requests into smaller write transactions may have additional benefits. For example, the smaller write transactions free the I/O adapter device's memory for other uses. Because the I/O adapter device has free memory, it can accept and handle other I/O transactions, either from the same virtual machine or from other virtual machines. When the I/O adapter device is able to handle multiple I/O transactions, in addition to the large write request, the I/O adapter device may be able to interleave the other I/O transactions between the smaller write transactions for the large write request; that is, instead of issuing all of the write transactions before issuing any other I/O request, the I/O adapter device can intersperse the other I/O requests between any of the outgoing write transactions. Similarly, the I/O adapter device can interleave write transactions generated from segmenting more than one large write request.

Another potential benefit is that segmenting a large write request may prevent the write request from blocking a queue. For example, the large write request may be removed from the head of the queue and be maintained in a pending state by the I/O adapter device and/or host device until all the write transactions for the write request have completed. In the meantime, smaller I/O requests may be issued from the same queue.

Interleaving of I/O requests and write transactions may also be affected by priorities. For example, a higher priority I/O request may be inserted between the write transactions of a lower priority, large write request to ensure that the higher priority I/O request is addressed according to its priority. Alternatively, the priority of the large write request may indicate how quickly the write request should be handled; the I/O adapter device request may stagger the individual write transactions farther apart in time, incidentally allowing other I/O requests to be interleaved with the write transactions.

III. Read Requests

Figure 7:
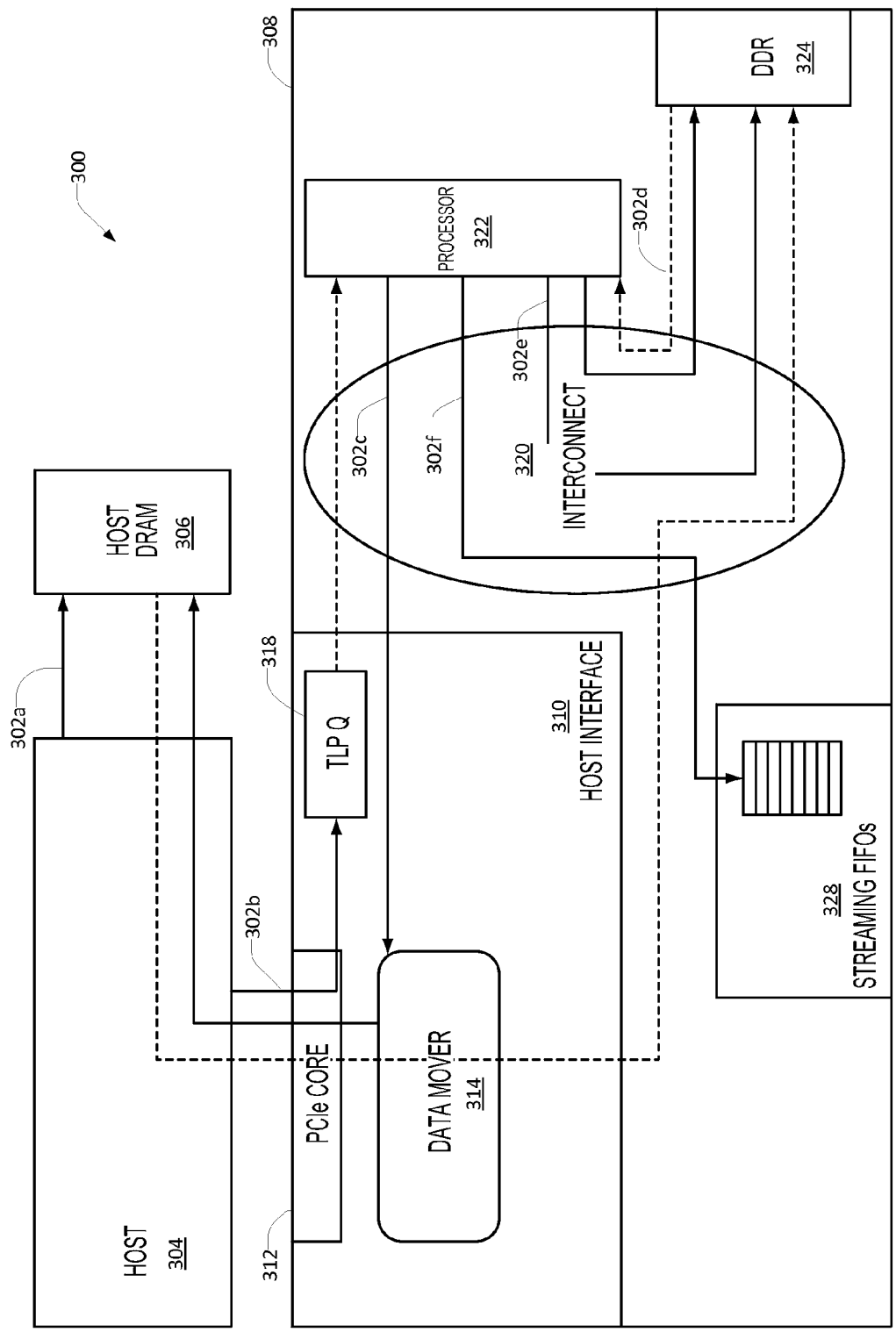
FIG. 7 illustrates one embodiment of how a storage read request may be transferred from a virtual machine on a host device to an I/O adapter device.
Figure 8:
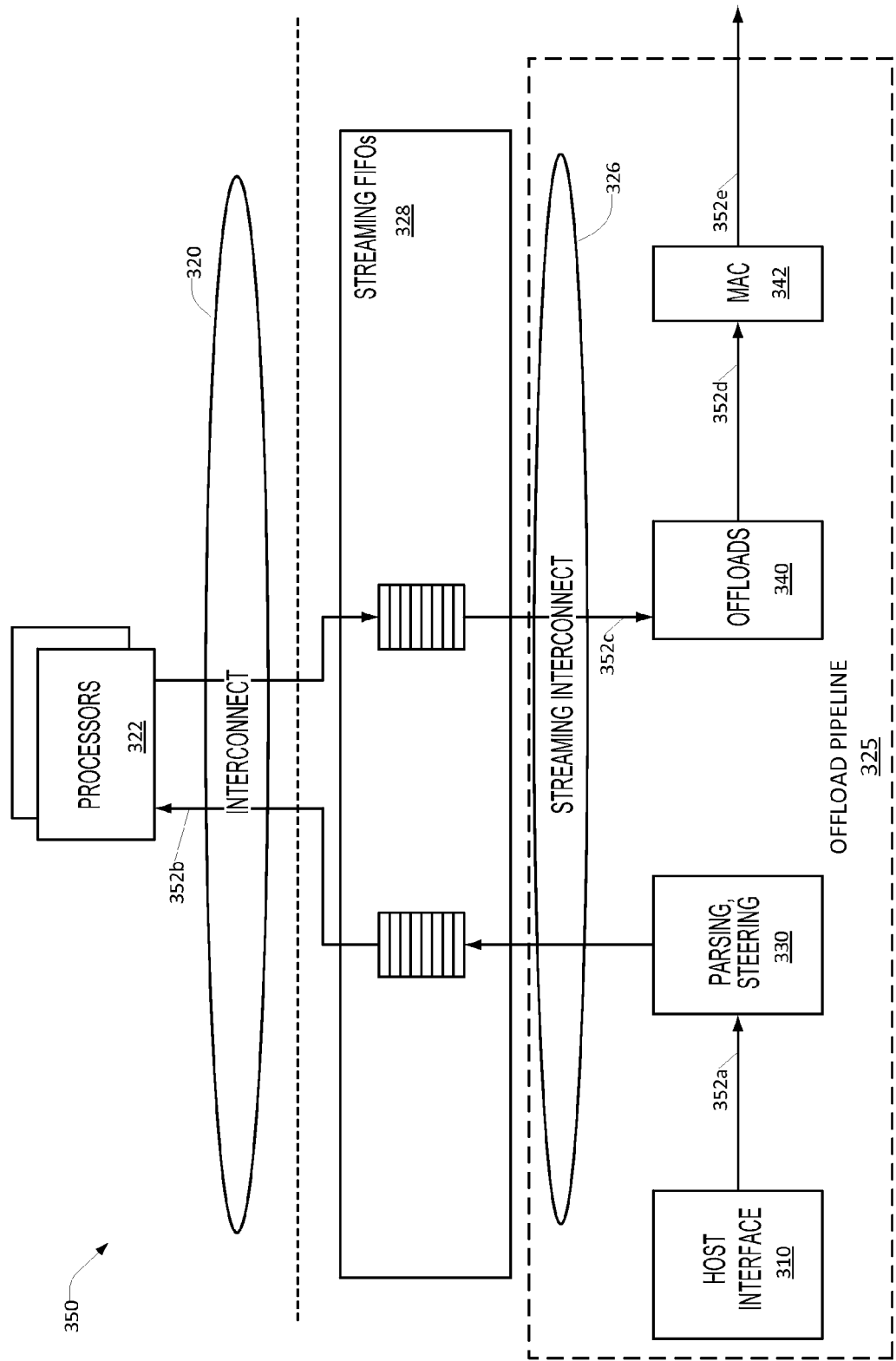
FIG. 8 illustrates one embodiment of a packet flow for moving the read request described in FIG. 7 from the host interface in the I/O adapter device to the I/O adapter device's offload pipeline, and then out to the network.
Figure 9:
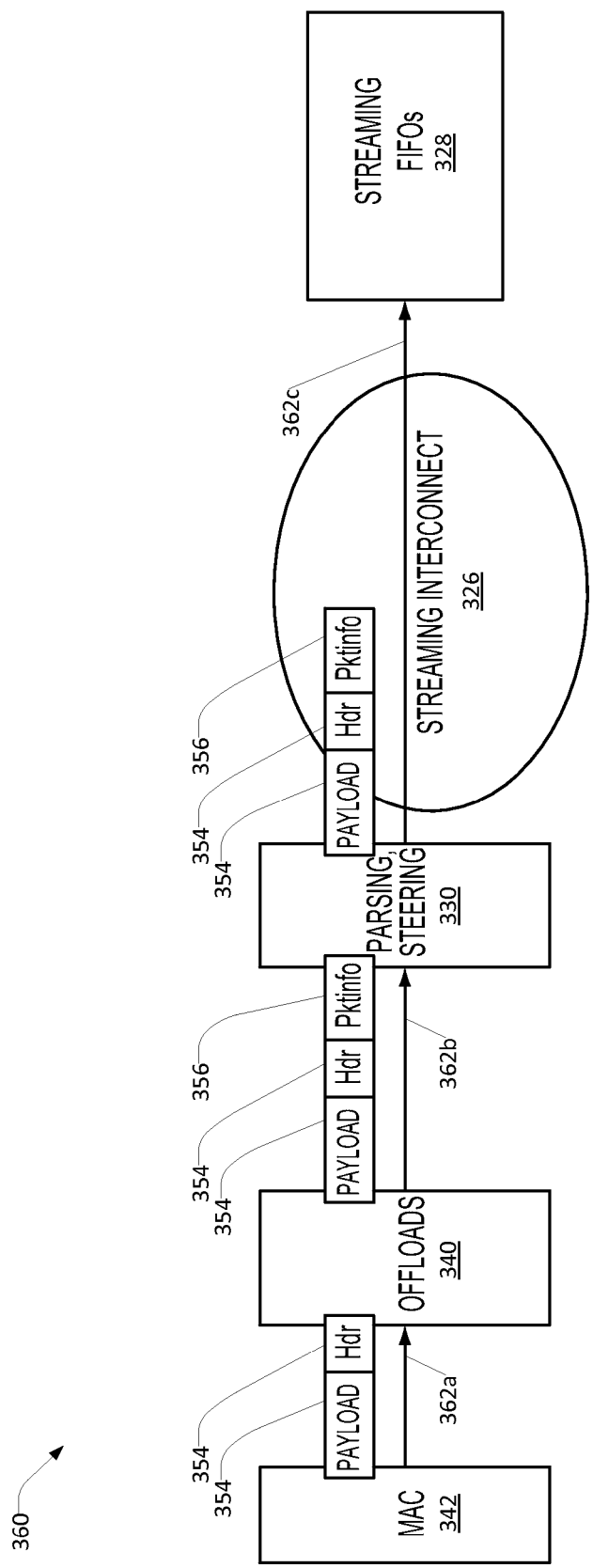
FIG. 9 illustrates one embodiment of a packet flow for a read response coming into the MAC unit from the network into the I/O adapter device's offload pipeline.

FIGS. 7-10 illustrate one embodiment of how a large storage read request is handled, including how the read request is segmented into smaller read transactions. These figures illustrate how a write request is transferred from a virtual machine on a host device to an I/O adapter device (FIG. 7), where the I/O adapter device segments the large read request into smaller read transactions. The smaller read transactions, each containing a portion of the read data, flow through I/O adapter device's offload pipeline, where they are processed and sent to a storage device (FIG. 8). Each of the smaller read transactions will receive a response from the storage device; these responses are transferred from the network interface to the I/O adapter device's offload pipeline (FIG. 9). The read responses flow through the offload pipeline, where they are processed (FIG. 10), and once all the read transactions have been issued and responded to, the I/O adapter device informs the virtual machine that the read request has completed.

FIG. 7 illustrates one embodiment of how a storage read request may be transferred from a virtual machine on a host device 304 to an I/O adapter device 308. The read request may be targeted to a storage device, such as a remote computing device, a network attached storage device, and/or a direct-attached storage device. Direct-attached storage devices include storage devices directly attached to the host device.

As with a large write request, a large read request can be nearly as large as, or larger than the available storage space on the I/O adapter device 308. Thus a single read or only a few reads may occupy all of the I/O adapter device's 308 resources, causing other I/O requests to experience delays. The I/O adapter device 308 may thus be configured with a maximum read burst size. The read burst size can apply to all read requests, and/or can be specified for each individual virtual device on the I/O adapter device, and/or can be specified for each individual read request. The maximum read burst size can be used by the I/O adapter device 308 to divide a large read request into multiple smaller read transactions, where each of the smaller read transactions only ask for as much data as the read burst size. The read response will thus contain only a portion of the requested read data, and the I/O adapter device will only be required to store the smaller, partial read data segments at any given time, thus freeing the I/O adapter device's 308 resources for other use. The I/O adapter device 308 will send a completion message to the virtual machine that requested the read only when all of the smaller read transactions have been responded to (except in possible situations where an error may have occurred). The virtual machine that requested the read will thus not be aware that the large read request was segmented into smaller read transactions.

In some embodiments, the data requested by a read transaction may be larger than a pre-determined frame size. The pre-determined frame size may be, for example, the maximum size of a network frame, as defined by a given network protocol. Alternatively, the frame size may be configured by software, or may be given by a hardware or firmware configuration. In such embodiments, a read response containing as much as a pre-determined burst size amount of data may be segmented by the sender into smaller read responses containing equal to or less than a frame-size amount of data. In such embodiments, the I/O adapter device may be configured to expect multiple frame-size read responses for one read request, as further described below. Alternatively or additionally, in some embodiments the I/O adapter device 308 itself may determine that the data requested by a read transaction is larger than the frame size. In such embodiments, the I/O adapter may itself segment the read transactions into frame-size read transactions. In such embodiments, read transactions and frame-size read transactions (collectively referred to hereinafter as read transactions) may be handled the same.

FIG. 7 illustrates one embodiment of the steps by which a read request is transferred from a virtual machine on a host device 304 to an I/O adapter device 308. In FIG. 7, a PCIe interface is given as an example of the communication channel between the host 304 and the I/O adapter device 308, and the host interface 310 may thus include a PCIe core 312.

As a first step, the virtual machine on the host device 304 will post 302a a read request by allocating read buffer space in the host DRAM 306. The virtual machine may also write a packet descriptor to the host DRAM 306, which indicates where in the host DRAM 306 the read buffer space is located.

As a second step, the virtual machine will notify 302b the I/O adapter device's host interface 310 that it has initiated a read request. In some embodiments where the I/O adapter device implements a PCIe core 312 in its host interface 310, this notification 302b may take the form of a doorbell write.

The doorbell write is steered to a TLP queue 318 that is associated with a processor 322 that is designated for processing transactions for the virtual machine.

As a third step, the designated processor 322 may program 302c a data mover 314 in the host interface 310 to fetch information about the read from the host DRAM 306. For example, the data mover 314 may fetch the packet descriptor, which indicates where in the host DRAM 306 information about the read request is located. In some embodiments, the processor 322 may have pre-fetched the packet descriptors, and thus not need to fetch the packet descriptors at this stage.

At this step, the designated processor 322 may determine that the read request is larger than a pre-determined size. When the read request is larger than the pre-determined size, the processor 322 may generate multiple read transactions, as described above. Each read transaction will ask for only as much data as a pre-determined burst size. The following steps describe the process of generating and transmitting the multiple read transactions, where each will read a portion of the data requested by the initial read request. In certain scenarios, where size of the read data request is smaller than the pre-determined burst size, a single transaction may be generated for the initial read request. Even in such scenarios where the data size of the read request is smaller than the pre-determine burst size, in certain implementations similar steps may be followed as described below.

As a fourth step, the designated processor 322 may read 302d descriptor information from the DDR 324 on the I/O adapter device 308. The descriptors stored in the DDR 224 include information about the read request. For example, the descriptors may include the request type, the size of the data to be transferred by the request, where the host DRAM 206 the data is to be placed, and/or where in the I/O adapter's payload buffer the data may be temporarily stored. Descriptors may be placed in the DDR 224 when the read request is initially sent to the I/O adapter device and is added by the I/O adapter to a list requests to be handled. For example, the read request may be added to a submission queue. The descriptor information may indicate that more descriptors should be fetched from the host DRAM 306.

As a fifth step, the designated processor 322 may record 302e in the DDR 324 information about where the read data for the read request should be placed in the host DRAM 306. In some embodiments, the designated processor 322 may also generate commands for the data mover 314 that contain the data placement information. When a large read request is segmented into smaller read transactions, the data placement information may specify where the portion of the read data fetched with each of the smaller read transactions is to be placed in host DRAM 306. As explained above, each of the read transactions asks for only a portion of the data requested by the initial read request. Hence, the designated processor 322 may maintain a list of locations for where the read data is to be placed, or may maintain a pointer, or may employ some other mechanism to track where the portions of the read data are to be placed in host DRAM 306. In some embodiments, the designated processor 322 may store this information in the DDR 324.

As a sixth step, the designated processor 322 may form PktInfo data and place 302f the PktInfo in a streaming FIFO 328 that may be associated with egress read transactions. The PktInfo may contain information such as the identity of the virtual machine that requested the read and storage access information for the device that contains the read data.

FIG. 8 illustrates one embodiment of a packet flow 350 for moving the read transaction packet described above from the host interface 310 in the I/O adapter device 308 to the I/O adapter device's 308 offload pipeline 325, and then out to the network. The offload pipeline 325 is illustrated here, by way of example, as including a host interface 310, a parsing and steering 330 unit, a network offloads 340 unit, and a MAC 342 unit. The offload pipeline 325 may include additional units not illustrated here, as necessary for other operations. In some embodiments, streaming FIFOs 328 pass data between the units of the offload pipeline 325, and between the offload pipeline 325 and one or more processors 322, and software on the processors 322 may operate on the data. In some embodiments, the units of the offload pipeline 325 communicate with the streaming FIFOs 328 by way of a streaming interconnect 326. In some embodiments, the units of the offload pipeline 325 communicate with each other through the streaming interconnect 326, and with the processors 322 through the streaming FIFOs 328 by way of the streaming interconnect 326. The processors 322 communicate with the streaming FIFOs 328 through a separate interconnect 320. The operation of the offload pipeline 325 can be modified and adapted by modifying the software executed by the processors 322.

As explained above with reference to FIG. 7, and as illustrated in FIG. 8, the host interface 310 will send 352a the PktInfo to a parsing and steering 330 unit. The parsing and steering 330 unit may parse the PktInfo and determine that the packet should be routed to a particular streaming FIFO 328 that is associated with egress data for the virtual machine that requested the read. The parsing and steering 330 unit communicates with the streaming FIFOs 328 by way of a streaming interconnect 326. In some embodiments the parsing and steering 330 unit may also initiate prefetching of a context that is associated with the virtual machine that requested the read.

The parsing and steering 330 unit may pass 352b the PktInfo for the read request to a processor 322 by way of a streaming FIFO 328. The processor 322 access the streaming FIFOS 328 through an interconnect 320. In embodiments in which the processors 322 are implemented as ARM cores, the interconnect 320 may be an AXI interconnect. The processor 322 may perform operations on the PktInfo, such as for instance network protocol processing. The processor 322 may generate a packet header, which includes any necessary network protocol information. The processor 322 may also update the PktInfo with additional information, such as any information required to perform CRC and/or checksum calculations. The processor 322 may then pass 352c the PktInfo and packet header to a network offloads 340 unit.

The network offloads 340 unit may perform operations on the PktInfo and/or packet header. For example, the network offloads 340 unit may perform stateless operations, such as Ethernet CRC generation, UDP or IP checksum generation, or any other checksum generation. The network offloads 340 unit may further remove the PktInfo and send 352d the now completed packet to a MAC 342 unit. The MAC 342 unit may then send 352e the packet out onto the network.

FIG. 9 illustrates one embodiment of a packet flow 360 for a read response coming into the MAC 342 unit from the network into the I/O adapter device's 308 offload pipeline 325. Each read transaction will receive a response from the network device to which the read transaction was directed. As noted above, in some embodiments the read response may contain frame-size read data instead of all the read data request by the read transaction. The read response will typically indicate that the read transaction completed successfully, but may also indicate that there was an error.

A read response packet will be received by the MAC 342 unit. As described above, the read data may arrive in multiple packets. As each read data response arrives, the read data associated with each response will be sent to the host DRAM 306, for instance, by initiating a DMA write to the host DRAM 306. The partial read data will not be stored on the I/O adapter device 308, thus freeing the I/O adapter device's 308 memory for other uses.

When the MAC 342 unit receives a read response packet, it will pass 362 the payload 354 and header 356 to the network offloads 340 unit. The network offloads 340 unit may perform operations on the packet, such as for instance stateless operations, including checking an Ethernet CRC, an IP or UDP checksum, or any other checksum. The network offloads 340 unit may place the result of such operations in a PktInfo 358. The network offloads 340 unit may then pass 362b the payload 354, header 356, and PktInfo 358 to the parsing and steering 330 unit.

As explained above, "stateless" here means that the network offloads 340 unit does not maintain state information between the individual read transactions sent for the large read request. For example, since the requested read data spans multiple read responses, an error correction value may be generated for each read data segment, instead of generating a single error correction value for the entire read data. A single error correction value would require maintaining the error correction state between each read transaction. Doing so may require additional hardware and/or additional software, or additional processing by the processors 222. In some embodiments, however, the I/O adapter device 308 may nevertheless be configured to generate a single error correction value. In other embodiments, whether to generate a one or multiple error correction values may be determined per request, per virtual device, per virtual machine, and/or per queue, depending on how the I/O adapter device 308 is configured.

The parsing and steering 330 unit may parse the packet header and determine that the packet should be routed to a particular streaming FIFO 328 that is associated with ingress traffic. The parsing and steering 330 unit may add information to the PktInfo 358 before directing 352c the packet to a streaming FIFO 328 by way of the streaming interconnect 326. In some embodiments, the parsing and steering 330 unit may also initiate prefetching of a context associated with the virtual machine that requested the read.

Figure 10:
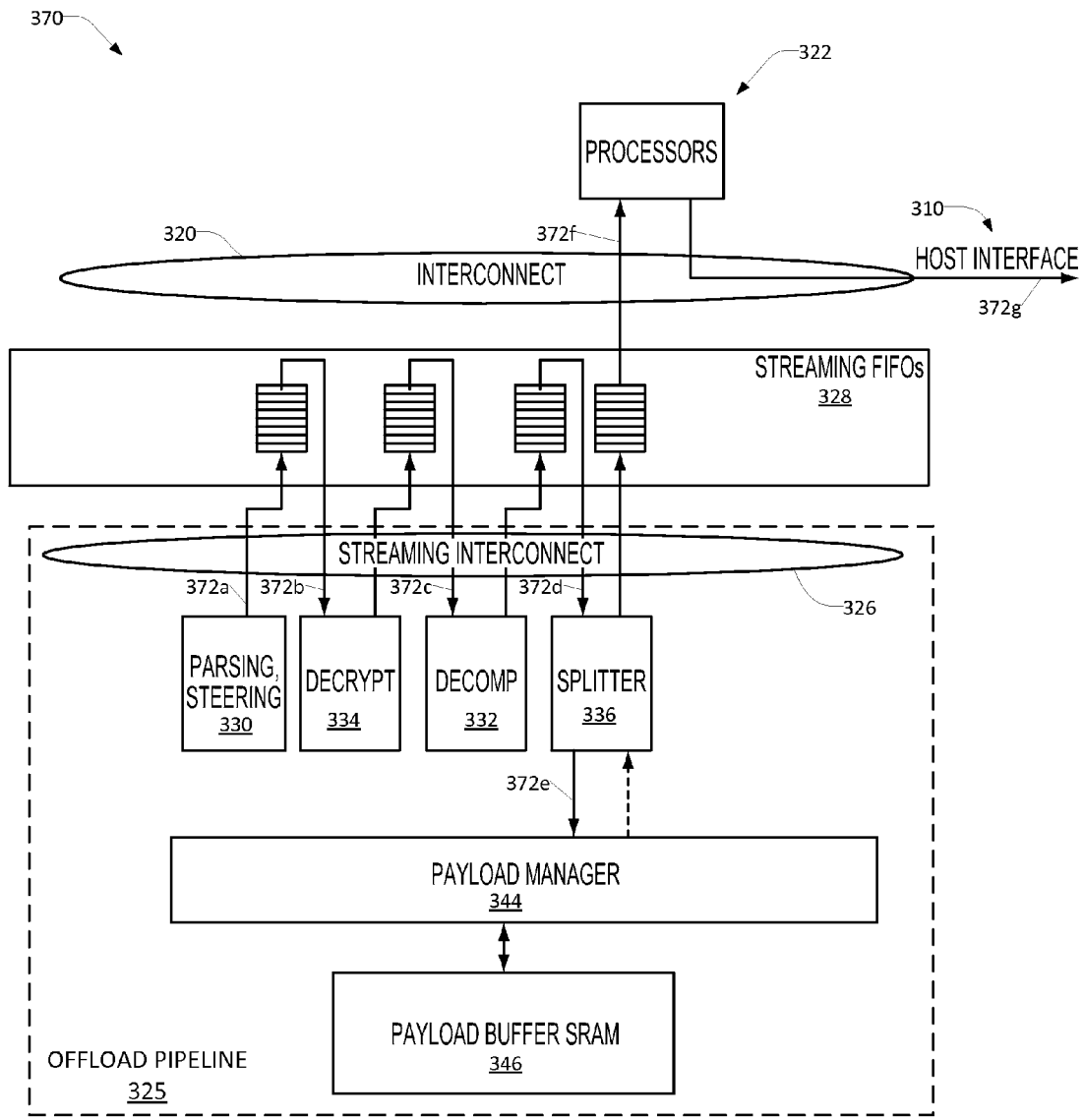
FIG. 10 illustrates one embodiment of the flow of the read response packet described in FIG. 9 through the offload pipeline in the I/O adapter device.

FIG. 10 illustrates one embodiment of the flow 370 of the read response packet described above through the offload pipeline 325 in the I/O adapter device 308. The offload pipeline 325 is illustrated here, by way of example, as including a parsing and steering 330 unit, a decryption 334 unit, a decompression 332 unit, a splitter 336 unit, a payload manager 344, and a payload buffer 346. The offload pipeline 325 may include additional units not illustrated here, as necessary for other operations. Streaming FIFOS 328 pass data between the units of the offload pipeline 325, and between the offload pipeline 325 and one or more processors 322. The units of the offload pipeline 325 communicate with the streaming FIFOs 328 by way of a streaming interconnect 326. The processors 322 communicate with the streaming FIFOs 328 through a separate interconnect 320.

As described above, the parsing and steering 330 unit passes 372a the packet payload, header, and PktInfo to a streaming FIFO 328, from which it is directed 372b to a decryption 334 unit. The decryption 334 unit may decrypt the packet payload. For example, the decryption 334 unit may include an AES-XTS decryption module. After decryption, the decryption 334 unit sends 372c the packet to the decompression 332 unit through a streaming FIFO 328. The decompression 332 unit may perform decompression on the decrypted read data payload. The decompression 332 unit sends 372d the decompressed read data payload to the splitter 336 unit by way of a streaming FIFO 328. The splitter 336 unit may request 372e buffer space for the read data payload. The payload manager 344 may return a handle to the payload buffer 346, where the handle indicates where the read data payload is to be written in the payload buffer 346. The splitter 336 unit uses the handle to write the read data payload to the payload buffer 346, and sends 372f the packet header to a processor 322 by way of a streaming FIFO 328.

The processor 322 may operate on the packet header. For example, the processor 322 may execute protocol processing, such as network protocol processing on the packet header. The processor 322 then notifies the host interface 310 that the read data payload should be transferred 372g from the payload buffer 346 to the host DRAM 306. In some embodiments, the processor 322 will execute this step by initiating a DMA request to the host interface 310, where the DMA request includes information for the host interface 310 to perform the transfer 372g of the read data from the payload buffer 346 to the host DRAM 306. The DMA request may also contain information for the host interface 310 to perform completion actions to notify the virtual machine that requested the read that the read is complete. When a large read request has been segmented into multiple smaller read transactions, the completion actions would not be performed until all parts of the read data have been received.

In some embodiments, the processor 322 may recognize that the response contained only a frame-size amount of data, which may happen when the data requested by the read transaction was larger than a pre-determined frame size. When such is the case, the sender of the read response may send multiple, frame-size read responses containing equal to or less than a frame-size amount of data. The processor 322 may in such cases by configured to expect multiple frame-size read responses for a single read transaction, and will initiate DMA requests to transfer the frame-size read data from each of these response to the host DRAM 306. The processor 322 may further not treat the read transaction as completed until all the frame-size read responses have been received.

In the above-described step, the read data is transferred from the payload buffer 346 to the host DRAM 306 for each of the smaller read transactions issued for the large read request. The I/O adapter device 308 will therefore only store a portion of all the read data at a time, thus freeing the I/O adapter device's 308 resources for other uses.

In some embodiments, the host interface 310 may also perform "zero block fill" actions; that is, the host interface 310 may generate data of a specified type and fill blocks of the read data with that data. For example, when the PktInfo includes a zero block bitmap, the host interface 310 may generate data blocks of all zero, as specified by the zero block bitmap. A block of data may be any size, such as 4 KB.

As can be seen from the above description, segmenting large read requests into smaller read transactions may have additional benefits. For example, the smaller read transactions free the I/O adapter device's memory for other uses. For example, the I/O adapter device may interleave other I/O transactions between the smaller read transactions for the large read request; that is, instead of issuing all of the read transactions before issuing any other I/O request, the I/O adapter device can intersperse the other I/O requests between any of the outgoing read transactions. Similarly, the I/O adapter device can interleave read transactions generated from segmenting more than one large read request.

These benefits apply to the read responses as well. Though read responses will typically be interleaved with responses for other I/O requests, when the I/O adapter device receives a large read response it may be fully occupied with the large amount of read data until it has finished processing the data, and may be unable to handle any other I/O requests or responses. Segmenting the large read request, however, also creates segmented read responses, which may temporally free up I/O adapter device's resources.

Another potential benefit is that segmenting a large read request may prevent the read request from blocking a queue. For example, the large read request may be removed from the head of the queue and be maintained in a pending state by the I/O adapter device and/or host device until all the read data is received. In the meantime, smaller I/O requests may be issued from the same queue.

Interleaving of I/O requests and read transactions may also be affected by priorities. For example, a higher priority I/O request may be inserted between the read transactions of a lower priority, large read request to ensure that the higher priority I/O request is addressed according to its priority. Alternatively, the priority of the large read request may indicate how quickly the read request should be handled; the I/O adapter device request may stagger the individual read transactions farther apart in time, incidentally allowing other I/O requests to be interleaved with the read transactions.

IV. Methods

Figure 11:
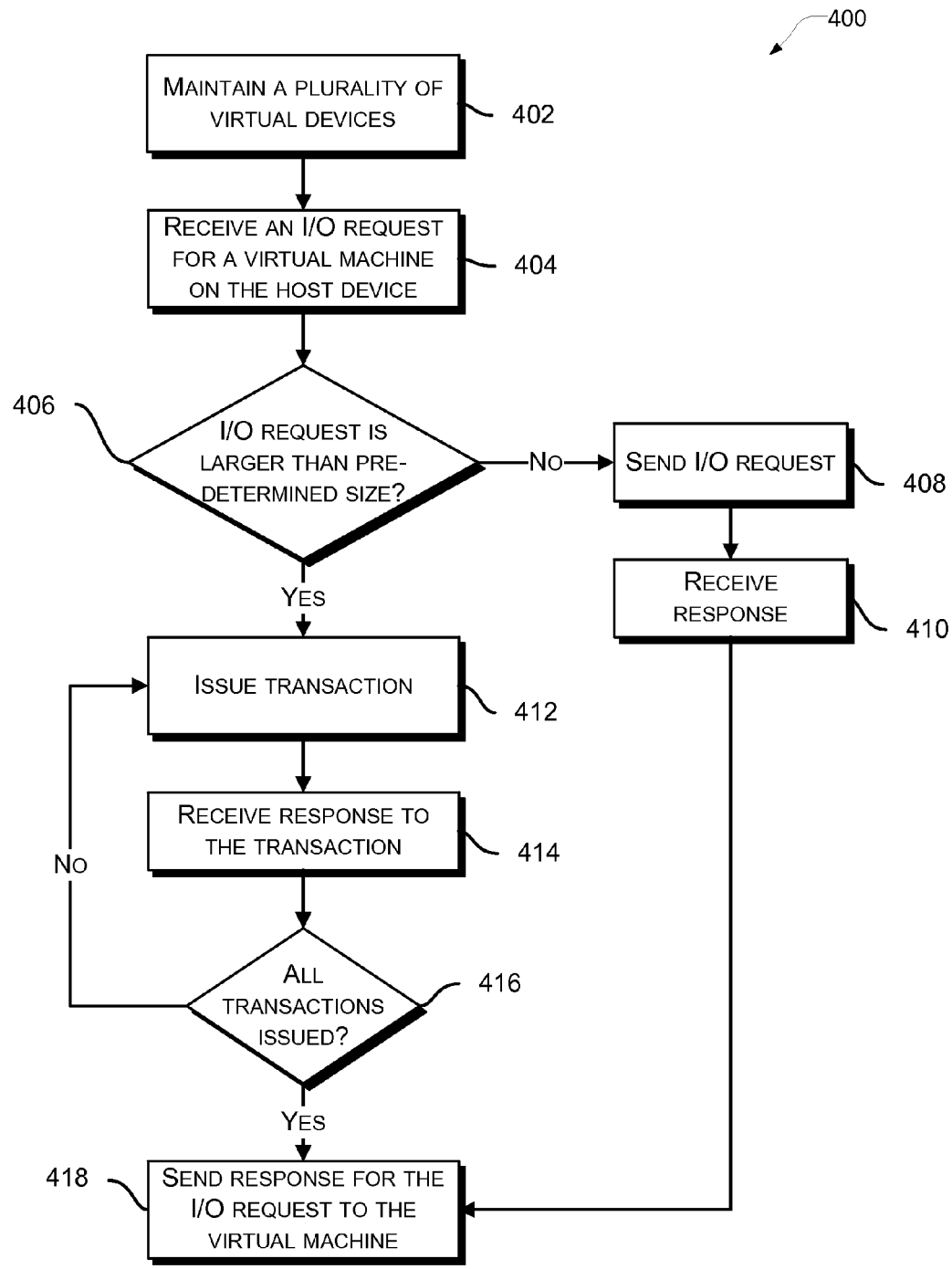
FIG. 11 illustrates one embodiment of a process for managing large I/O transactions.
Figure 12:
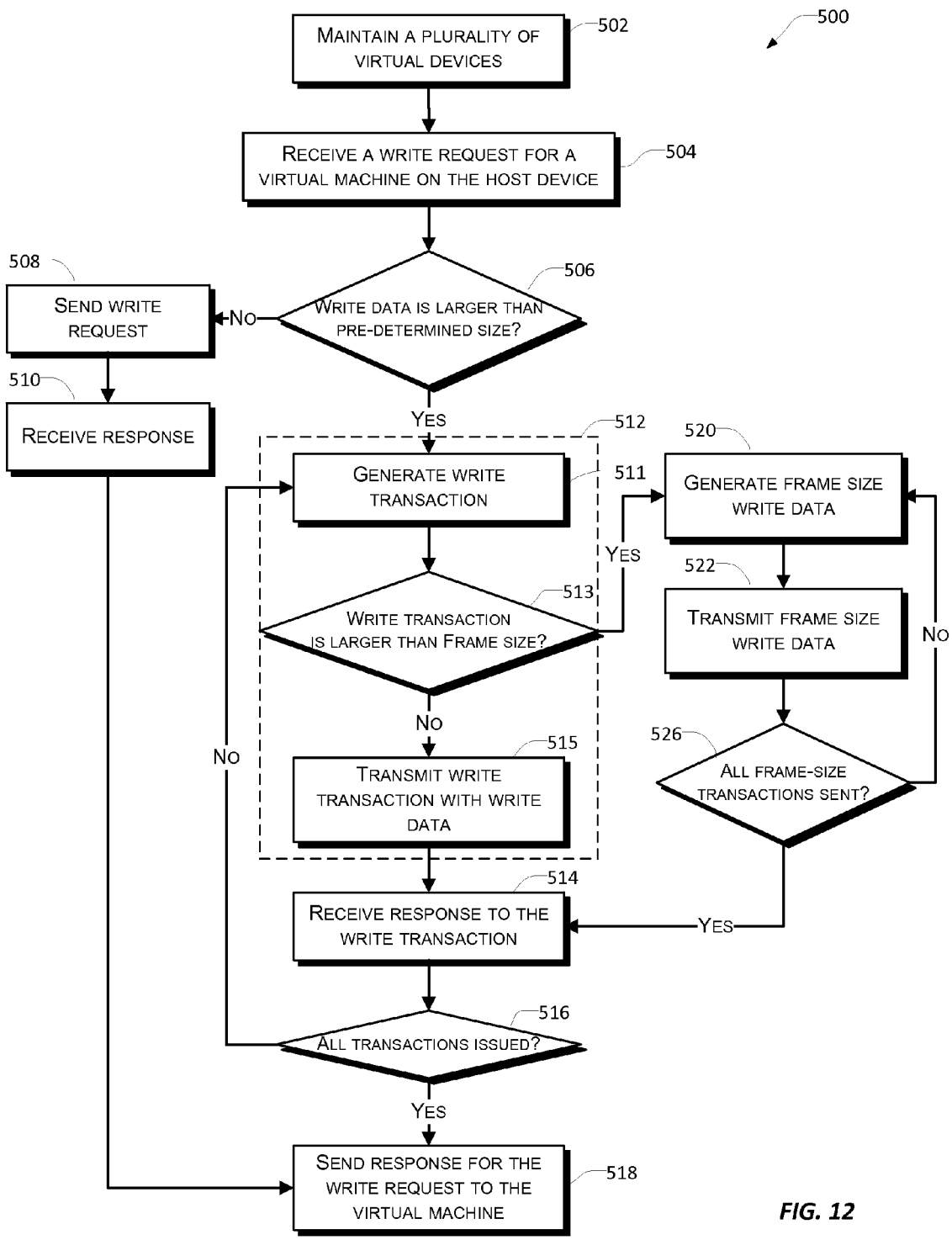
FIG. 12 illustrates one embodiment of a process for managing large write requests.
Figure 13:
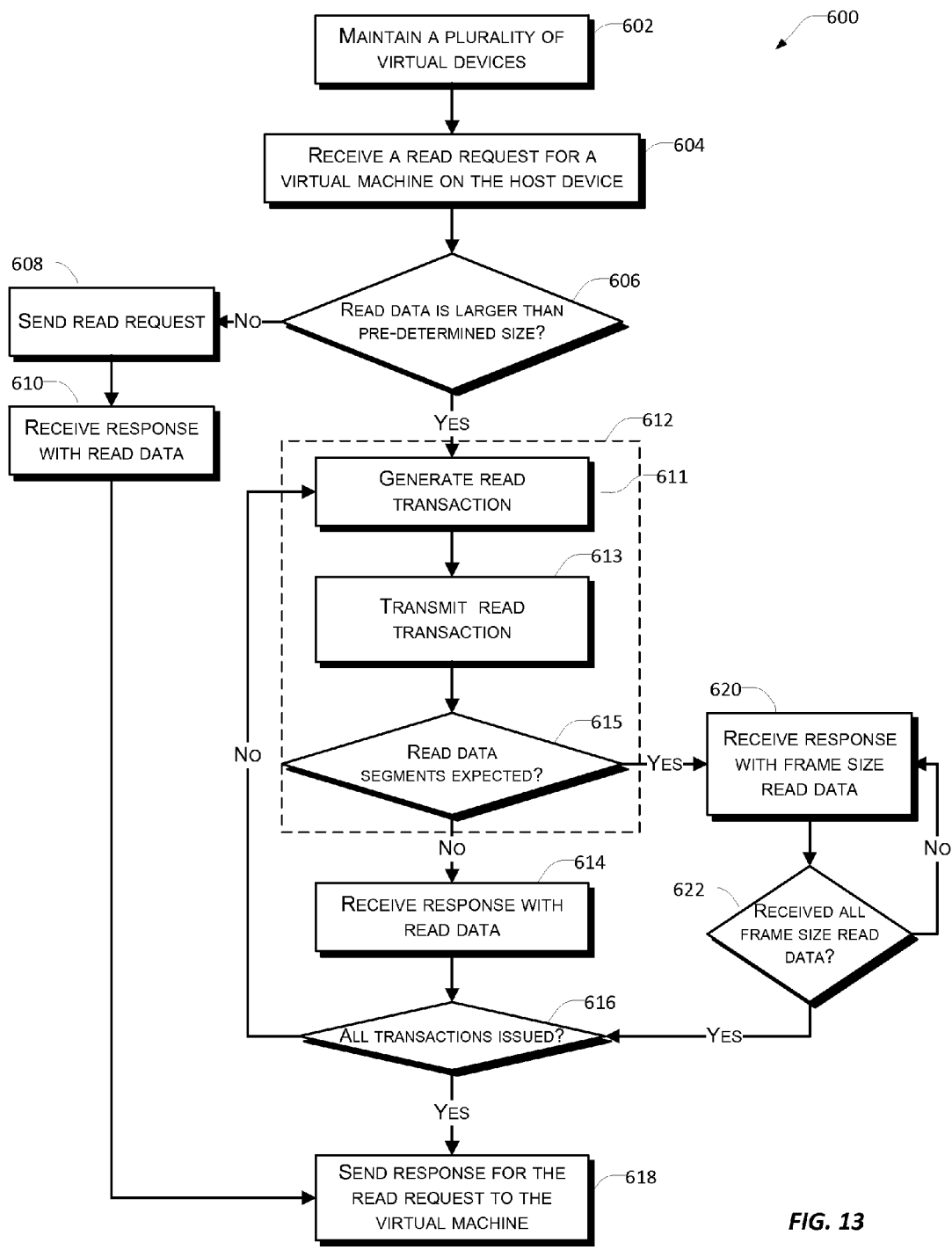
FIG. 13 illustrates one embodiment of a process for managing large read requests.

FIGS. 11-13 illustrate methods for managing large I/O requests. These methods may be implemented by the systems described above.

FIG. 11 illustrates one embodiment of a process 400 for managing large I/O transactions. The process can be performed by the I/O adapter device 102 and/or one or more CPUs 103 as illustrated in FIG. 1, or any other suitable combination of hardware, software, and/or firmware.

As illustrated in FIG. 11, at step 402 of the process 400 a plurality of virtual devices are maintained. Virtual devices such as these are described in relation to FIG. 2. As in FIG. 2, in FIG. 11 the virtual devices are operable to receive I/O requests from a host device and issue transactions for those I/O requests to a network. The virtual devices will also receive responses to the issued transactions, and send a response to the I/O request to the host device.

At step 404 an I/O request is received from a virtual machine on a host device. The virtual machine can be one such as is illustrated in FIG. 2. The I/O request can be a read request or a write request, as described in further detail below, with reference to FIGS. 12 and 13.

Returning to FIG. 11, at step 406 the process 400 determines whether the I/O request is larger than a pre-determined size. The I/O request size is determined by the amount data to be written or read. The pre-determined size can be configurable by software, and can be stored in software and/or in a hardware register. The pre-determined burst size may be an arbitrary size or may be based on the size of the storage buffers and various caches on the I/O adapter device 208, the bandwidth or latency of various hardware logic and paths, the average size of the write requests, the service level agreements associated with specific virtual machines or transfer size specified by a network protocol. For example, the network protocol may specify a maximum transfer unit (MTU), which can be, for example, as small as 1500 bytes to as large as 9000 bytes. In some instances, the burst size may be pre-configured but dynamic, such that the burst size may be altered based on various metrics related to the current I/O load (e.g., network load) being handled by the I/O adapter device 208 at any given point in time.

When the I/O request is not larger than the pre-determined size, at step 408 the I/O request the process 400 issues the I/O request as normal. At step 410 the process 400 receives response to the I/O request, and then moves to step 418, where the process 400 sends a response for the I/O request to the virtual machine that made a request. This response indicates to the virtual machine that the write completed.

When the I/O request is larger than the pre-determined size, at step 412 the process 400 issues one or more transactions to the network, where each transaction represents the I/O request, and the size of the request is a pre-determined burst size. Issuing a transaction includes generating the transaction and transmitting the transaction to the network. Because the size of the transaction is the pre-determined burst size, the transaction will only encompass part of the data of the I/O request. The number of transactions to send will be determined by the pre-determined burst size. The burst size may be specified by the network protocol, or may be software configurable.

The transaction issued at step 412 will receive a response at step 414 from the network. The response may indicate that the transaction completed successfully. The response may also indicate that the transaction encountered an error. The following steps assume that the transaction completed successfully.

At step 416 the process 400 checks whether all transactions for the I/O request have been sent. Because each transaction only includes part of the data for the I/O request, multiple transactions will be sent. Thus when at step 416 the process 400 determines that not all the transactions have been sent, the process returns to step 412 to send the next transaction. When at step 416 the process 400 determines that all transactions have, in fact, been sent, the process 400 continues to step 418. At step 418 the process 400 sends a response for the I/O request to the virtual machine that request the I/O request, to indicate that the I/O request has completed.

As noted above, the I/O requests described in FIG. 11 can be write requests or read requests. FIG. 12 illustrates one embodiment of a process 500 for managing large write requests.

At step 502 the process 500 maintains a plurality of virtual devices. The virtual devices are operable to receive I/O requests from a host device and issue transactions for those I/O requests to a network. The virtual devices will also receive responses to the issued transactions, and send a response to the I/O request to the host device.

At step 504 a write request is received from a virtual machine on a host device. The write request will include data of a certain size. At this step the data is located on the host device (for instance, in host DRAM) and thus does not occupy space on the device that is executing the process 500 (i.e. the I/O adapter device).

At step 506 the process 500 determines whether the write data size is larger than a pre-determined size. When the write data is not larger than the pre-determined size, the process 500 continues to step 508, at which the write request is sent as normal. Step 508 includes transferring the write data from the host device to the device that is executing the process 500, and from there to the network. At step 510 the process 500 receives a response to the write request, typically indicating that the write request completed successfully. The process 500 then continues to step 518, where a response is sent for the write request to the virtual machine that requested the write, indicated that the write has completed.

When, at step 506, the process 500 determines that the write data is larger than the pre-determined size, the process 500 proceeds to a stage for issuing 512 one or more write transactions to the network. Issuing 512 write transactions includes at least two steps, and in some embodiments includes at least three steps. The first step 511 is to generate at least one write transaction. Each write transaction will include a portion of the write data, where the amount of this partial write data is determined by a pre-determined burst size. The total number of write transactions issued 512 will be determined by the burst size.

When each write transaction is generated at step 511, the process 500 may transfer the partial write data from the host device to the device that is executing the process 500. Alternatively, the process 500 may transfer the partial write data at a later stage, such as when the write transaction is transmitted 515. In any case, during this process 500 the device executing the process 500 (i.e., an I/O adapter device) will only store a portion of the write data at a time, thus reducing the storage burden on the device. In some embodiments, issuing 512 transactions may include generation of error correction data, such as a checksum, for the partial write data being sent with each transaction. In other embodiments, a single error correction value, spanning all of the write data, may be generated and maintained by the process 500. Whether multiple error correction values or a single error correction value is generated can be configured globally for all write requests and/or can be configured for each individual write request.

In some embodiments, the generated write transaction may include data that may be further segmented into yet smaller write transactions. For example, the pre-determined burst size may be larger than a pre-determined frame size. The frame size may be, for example, a network frame size, that is, the maximum size of the data that can be transmitted for a given network protocol. Alternatively, the frame size may be configured by software, or may be determined by a hardware or firmware configuration. The data for a given write transaction may thus be segmented into multiple, frame-size write data segments. In such embodiments, the process 500 may test, at step 513, whether the data included a write transaction, which is less than or equal to the pre-determined burst size, is larger than the pre-determined frame size. If so, the process 500 proceeds to step 520.

At step 520, the process 500 may generate one or more write data segments that include write data that is less than or equal to a pre-determined frame size. Each such frame-size write data segment will include at most a frame-size portion of the data of a write transaction generated 512 in the issuing 512 process. In some embodiments, at step 520 the process 500 may generate an error correction value, such as a checksum, for the frame-size write data. At step 522 each frame-size write data segment is transmitted to the network. At step 526, the process 500 determines whether all the frame-size write segments generated for a given write transaction have been sent. If not, the process returns to step 520. If so, the process proceeds to step 514. At step 514 the process 500 receives a response for the write transaction that generated the frame-size write data segments, and proceeds to step 516. At step 516 the process 500 determines whether all write transactions for the write request being processed have been issued. If not, the process 500 returns to step 511.

At step 511 the process 500 may generate the next write transaction, and proceed to step 513. When, at step 513, the process 500 determines that the write transaction is not larger than the pre-determined frame size, the process 500 proceeds to step 515. At step 515 the write transaction is transmitted to the network, and the process proceeds to step 514. At step 514 the process 500 receives a response for each write transaction transmitted at step 515. This response may indicate that the write transaction completed successfully. The response may also indicate that the write transaction encountered an error. The following steps assume that the write transaction completed successfully.

At step 516 the process 500 checks whether all write transactions have been sent. All write transactions have been sent when all of the data for the write request has been sent and responses have been received. When, at step 516, the process 500 determines that not all write transactions have been sent, the process 500 returns to step 511. When step 516 determines that all the write transactions have been sent, the process 500 continues to step 518. At step 518 the process 500 sends a response for the write request to the virtual machine that requested the write, to inform the virtual machine that the write has completed.

FIG. 13 illustrates one embodiment of a process 600 for managing large read requests. At step 602 the process 600 maintains a plurality of virtual devices. The virtual devices are operable to receive I/O requests from a host device and issue transactions for those I/O requests to a network. The virtual devices will also receive responses to the issued transactions, and send a response to the I/O request to the host device.

At step 604 a read request is received from a virtual machine on a host device. The read request will be requesting data of a certain size. At step 606 the process 600 determines whether the read data size is larger than a pre-determined size. When the read data is not larger that the pre-determined size, the process 600 continues to step 608, at which the read request is sent as normal. At step 610 the process 600 receives a response to read request. This response will include the requested read data. At step 618, the process 600 will send a response for the read request to the virtual machine that made the request, including transferring the read data from the device executing the process 600 to the host device. At step 618, the process will also indicate to the virtual machine that the read request has completed.

When, at step 606, the process 600 determines that the read data is larger than the pre-determined size, the process 600 will proceed to a stage for issuing 612 one or more read transactions to the network. Issuing 612 read transactions includes at least two steps, and in some embodiments includes at least three steps. The first step 611 is to generate at least one read transaction. Each read transaction will request a portion of the read data, where the amount of this partial read data is determined by a pre-determined burst size. The second step 613 is to transmit each of the read transactions to the network. The total number of read transactions issued 612 will be determined by the burst size.

In some embodiments, the responses for the generated read transaction may be segmented into smaller responses. For example, the pre-determined burst size may be larger than a pre-determined frame size. The responses for a given read transaction may thus be segmented into multiple, frame-size read data segments. In such embodiments, the process 600 may test, at step 615, whether read data segments are expected, instead of a single read response, for the read transaction that whose requested data is larger than the pre-determined frame size. If so, the process 600 proceeds to step 620.

At step 620, the process 600 may receive one or more read responses. The read responses received at step 620 have been segmented by the sender such that each of these read responses contains less than or equal to frame-size data. At step 620, the process 600 may transfer this frame-size read data from the device that is executing the process 600 to the host device. In some embodiments, the process 600 may also evaluate an error correction value, such as a checksum, that came with the frame-size read data. Additionally or alternatively, the frame-size read response may indicate that an error occurred. At step 622 the process 600 determines whether all the frame-size read responses have been received for a given read transaction. If not, the process 600 returns to step 620. If so, the process proceeds to step 616. At step 616 the process 600 determines whether all read transactions for the read request being process have been issued. If not, the process returns to step 611.

At step 611 the process 600 may generate the next read transaction, and proceed to step 613 to transmit the read transaction. When, at step 615, the process 600 determines that the read response will not be larger than the pre-determined frame size, the process 600 proceeds to step 614.

At step 614 the process 600 receives a response for each read transaction issued 612. This response will include the partial read data requested by each read transaction. At this step 614, the process 600 may transfer the partial read data from the device that is executing the process 600 to the host device. Thus, during this process 600, the device executing the process 600 (i.e., an I/O adapter device) will only store a portion of the read data at a time, thus reducing the storage burden on the device. In some embodiments, the response includes an error correction value for each partial read data segment. At step 614 the process 600 may evaluate the error correction value. In other embodiments, the process 600 may expect a single error correction value to arrive with the last partial read data segment, and thus will maintain a running error correction value. Whether a multiple error correction values or a single error correction value will be included with the partial read data can be configured globally for all read requests, and/or can be configured for each individual read request.

At step 616 the process 600 checks whether all the read transactions have been sent. All read transactions have been sent when all of the read data has been received. When, at step 616, the process 600 determines that not all the read data has been received, the process 600 returns to step 612. When step 616 determines that all the read data has been received, the process 600 continues to step 618. At step 618 the process 600 sends a response for the read request to the virtual machine that requested the read, to inform the virtual machine that the read has completed.

Some or all of the processes 400, 500, 600 (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

V. Computer Apparatus

Figure 14:
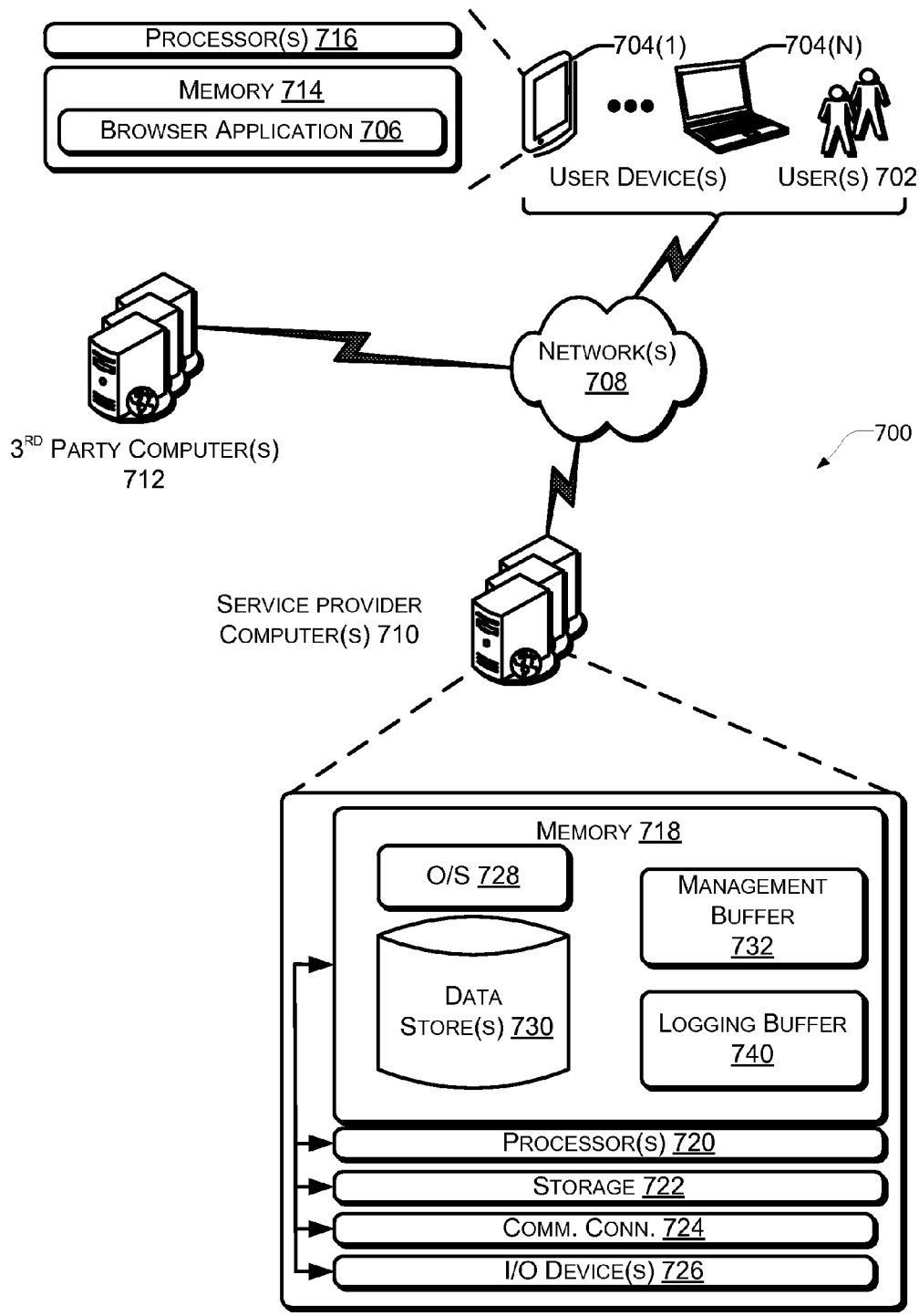
FIG. 14 illustrates an exemplary architecture for features and systems described herein that includes one or more service provider computers and/or a user device connected via one or more networks, according to at least one exemplary embodiment.

FIG. 14 illustrates an exemplary architecture for features and systems described herein that includes one or more service provider computers and/or a user device connected via one or more networks, according to at least one exemplary embodiment. The devices discussed in FIGS. 1-13, may use one or more components of the computing devices described in FIG. 14 or may represent one or more computing devices described in FIG. 14. In the illustrated architecture 700, one or more users 702 may use user computing devices 704(1)-(N) to access an application 706 (e.g., a web browser or mobile device application), via one or more networks 708. In some aspects, the application 706 may be hosted, managed and/or provided by a computing resources service or service provider. One or more service provider computers 710 may provide a native application which is configured to run on the user devices 704 which user(s) 702 may interact with. The service provider computer(s) 710 may, in some examples, provide computing resources such as, but not limited to, client entities, low latency data storage, durable data storage, data access, management, virtualization, cloud-based software solutions, electronic content performance management, etc. The service provider computer(s) 710 may also be operable to provide web hosting, computer application development and/or implementation platforms, combinations of the foregoing or the like to the user(s) 702. The service provider computer(s) 710, in some examples, may communicate with one or more third party computers 712.

In some examples, network(s) 708 may include any one or a combination of many different types of networks, such as cable networks, the Internet, wireless networks, cellular networks and other private and/or public networks. While the illustrated example represents the user(s) 702 accessing an application 706 over the network(s) 708, the described techniques may equally apply in instances where the user(s) 702 interact with the service provider computer(s) 710 via user device(s) 704 over a landline phone, via a kiosk or in any other manner. It is also noted that the described techniques may apply in other client/server arrangements (e.g., set-top boxes, etc.), as well as in non-client/server arrangements (e.g., locally stored applications, etc.).

As described briefly above, the application 706 may allow the user(s) 702 to interact with the service provider computer(s) 710 such as to access web content (e.g., web pages, music, video, etc.). The service provider computer(s) 710, which may be arranged in a cluster of servers or as a server farm, may host the application 706 and/or cloud-based software services. Other server architectures may also be used to host the application 706. The application 706 may be capable of handling requests from many users 702 and serving, in response, various item web pages. The application 706 can provide any type of website that supports user interaction, including social networking sites, online retailers, informational sites, blog sites, search engine sites, news and entertainment sites and so forth. As discussed above, the described techniques can similarly be implemented outside of the application 706, such as with other applications running on the user device(s) 704.

The user device(s) 704 may be any type of computing device such as, but not limited to, a mobile phone, a smart phone, a personal digital assistant (PDA), a laptop computer, a desktop computer, a thin-client device, a tablet PC, an electronic book (e-book) reader, etc. In some examples, the user device(s) 704 may be in communication with the service provider computer(s) 710 via the network(s) 708, or via other network connections. Additionally, the user device(s) 704 may be part of the distributed system managed by, controlled by or otherwise part of the service provider computer(s) 710 (e.g., a console device integrated with the service provider computers 710).

In one illustrative configuration, a user device(s) 704 may include at least one memory 714 and one or more processing units (or processor(s) 716). The processor(s) 716 may be implemented as appropriate in hardware, computer-executable instructions, firmware, or combinations thereof. Computer-executable instruction or firmware implementations of the processor(s) 716 may include computer-executable or machine-executable instructions written in any suitable programming language to perform the various functions described. The user device(s) 704 may also include geo-location devices (e.g., a global positioning system (GPS) device or the like) for providing and/or recording geographic location information associated with the user device(s) 704.

The memory 714 may store program instructions that are loadable and executable on the processor(s) 716, as well as data generated during the execution of these programs. Depending on the configuration and type of the user device(s) 704, the memory 714 may be volatile (such as random access memory (RAM)) and/or non-volatile (such as read-only memory (ROM), flash memory, etc.). The user device(s) 704 may also include additional removable storage and/or non-removable storage including, but not limited to, magnetic storage, optical disks and/or tape storage. The disk drives and their associated computer-readable media may provide non-volatile storage of computer-readable instructions, data structures, program modules and other data for the computing devices. In some implementations, the memory 714 may include multiple different types of memory, such as static random access memory (SRAM), dynamic random access memory (DRAM), or ROM.

Turning to the contents of the memory 714 in more detail, the memory 714 may include an operating system and one or more application programs or services for implementing the features disclosed herein including at least a user provided input element or electronic service web page, such as via a browser application 706 or dedicated applications (e.g., smart phone applications, tablet applications, etc.). The browser application 706 may be configured to receive, store and/or display a website or other interface for interacting with the service provider computer(s) 710. Additionally, the memory 714 may store access credentials and/or other user information such as, but not limited to, user IDs, passwords and/or other user information. In some examples, the user information may include information for authenticating an account access request such as, but not limited to, a device ID, a cookie, an IP address, a location or the like. In addition, the user information may include a user-provided response to a security question or a geographic location obtained by the user device 704.

In some aspects, the service provider computer(s) 710 may also be any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 710 are executed by one or more virtual machines implemented in a hosted computing environment. The hosted computing environment may include one or more rapidly provisioned and released computing resources, which computing resources may include computing, networking and/or storage devices. A hosted computing environment may also be referred to as a cloud computing environment. In some examples, the service provider computer(s) 710 may be in communication with the user device(s) 704 and/or other service providers via the network(s) 708, or via other network connections. The service provider computer(s) 710 may include one or more servers, perhaps arranged in a cluster, as a server farm, or as individual servers not associated with one another. These servers may be configured to implement the keyword classification and rating feature services described herein as part of an integrated, distributed computing environment.

In one illustrative configuration, the service provider computer(s) 710 may include at least one memory 718 and one or more processing units (or processor(s) 720). The processor(s) 720 may be implemented as appropriate in hardware, computer-executable instructions, firmware or combinations thereof. Computer-executable instruction or firmware implementations of the processor(s) 720 may include computer-executable or machine-executable instructions written in any suitable programming language to perform the various functions described.

In some instances, the hardware processor(s) 720 may be a single core processor or a multi-core processor. A multi-core processor may include multiple processing units within the same processor. In some embodiments, the multi-core processors may share certain resources, such as busses and second or third level of cache between multiple-cores. In some instances, each core in a single or multi-core processor may also include multiple executing logical processors (or threads). In such a core (that supports multiple logical processors), several stages of the execution pipeline and also lower level caches may also be shared.

The memory 718 may store program instructions that are loadable and executable on the processor(s) 720, as well as data generated during the execution of these programs. Depending on the configuration and type of the service provider computer(s) 710, the memory 718 may be volatile (such as RAM) and/or non-volatile (such as ROM, flash memory, etc.). The service provider computer(s) 710 or servers may also include additional storage 722, which may include removable storage and/or non-removable storage. The additional storage 722 may include, but is not limited to, magnetic storage, optical disks and/or tape storage. The disk drives and their associated computer-readable media may provide non-volatile storage of computer-readable instructions, data structures, program modules and other data for the computing devices. In some implementations, the memory 718 may include multiple different types of memory, such as SRAM, DRAM, or ROM.

The memory 718, the additional storage 722, both removable and non-removable are all examples of computer-readable storage media. For example, computer-readable storage media may include volatile or non-volatile, removable or non-removable media implemented in any method or technology for storage of information such as computer-readable instructions, data structures, program modules or other data. The memory 718 and the additional storage 722 are all examples of computer storage media. Additional types of computer storage media that may be present in the service provider computer(s) 710 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 710. Combinations of any of the above should also be included within the scope of computer-readable media.

Alternatively, computer-readable communication media may include computer-readable instructions, program modules or other data transmitted within a data signal, such as a carrier wave or other transmission. However, as used herein, computer-readable storage media does not include computer-readable communication media.

The service provider computer(s) 710 may also contain communications connection(s) 724 that allow the service provider computer(s) 710 to communicate with a stored database, another computing device or server, user terminals and/or other devices on the network(s) 708. The service provider computer(s) 710 may also include I/O device(s) 726, such as a keyboard, a mouse, a pen, a voice input device, a touch input device, a display, speakers, a printer and the like.

The memory 718 may include an operating system 728, one or more data stores 730 and/or one or more application programs or services for implementing the features disclosed herein, including a management buffer 732 and a logging buffer 740. The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in FIG. 14, and/or functions described herein can be provided by one or more modules that exist as separate modules and/or module functions described herein can be spread over multiple modules.

Figure 15:
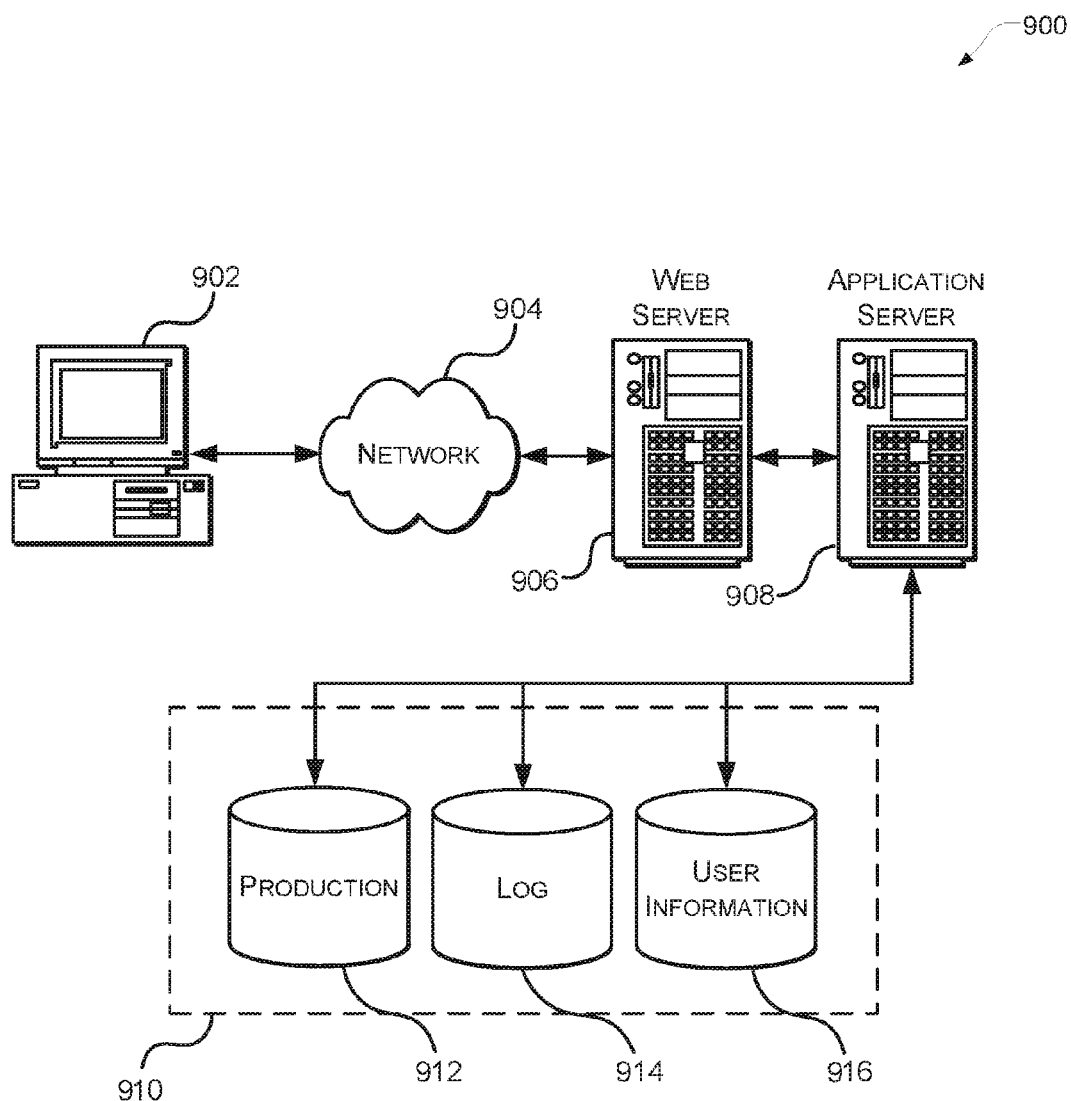
FIG. 15 illustrates an environment in which various embodiments can be implemented.

FIG. 15 illustrates aspects of an example environment 900 for implementing aspects in accordance with various embodiments. As will be appreciated, although a Web-based environment is used for purposes of explanation, different environments may be used, as appropriate, to implement various embodiments. The environment includes an electronic client device 902, which can include any appropriate device operable to send and receive requests, messages or information over an appropriate network 904 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 902 and the application server 908, can be handled by the Web server. It should be understood that the Web and application servers are not required and are merely example components, as structured code discussed herein can be executed on any appropriate device or host machine as discussed elsewhere herein.

The data store 910 can include several separate data tables, databases or other data storage mechanisms and media for storing data relating to a particular aspect. For example, the data store illustrated includes mechanisms for storing production data 912 and user information 916, which can be used to serve content for the production side. The data store also is shown to include a mechanism for storing log data 914, which can be used for reporting, analysis or other such purposes. It should be understood that there can be many other aspects that may need to be stored in the data store, such as for page image information and to access right information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 902. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 15. Thus, the depiction of the system 900 in FIG. 15 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Various embodiments of this disclosure are described herein, including the best mode known to the inventors for carrying out the disclosure. Variations of those embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. An Input/Output (I/O) adapter device comprising:
   a processor comprising one or more processing cores, wherein each processing core is configured to execute a respective plurality of computer-executable instructions; and
   an offload pipeline;
   wherein the I/O adapter device is configured to:
      receive an I/O request from a virtual machine executing on a host device, when the I/O adapter device is coupled to the host device, wherein the I/O request is a write request;
      determine that the I/O request is larger than a pre-determined size;
      transmit one or more transactions, wherein the one or more transactions represent the I/O request, wherein a number of the one or more transactions is determined by a size of the I/O request and a pre-determined I/O burst size and wherein write data for the I/O request is segmented into the one or more transactions;
      receive responses to each of the one or more transactions; and
      send a response for the I/O request to the virtual machine, wherein the response for the I/O request indicates that the write request was completed.

2. The I/O adapter device of claim 1, wherein the I/O adapter device is further configured to generate a respective checksum for each write data in each of the one or more transactions.

3. The I/O adapter device of claim 1, wherein transmitting further comprises:
   determining that at least one of the one or more transactions is larger than a pre-determined frame size; and
   transmitting one or more frame-size write data segments, wherein each frame-size write segment includes a portion of the write data that is equal to or less than the pre-determined frame size.

4. The I/O adapter device of claim 3, wherein the I/O adapter device is further configured to generate a respective checksum for each of the one or more frame-size write data segment.

5. The I/O adapter device of claim 1, wherein the I/O adapter device is further configured to:
   receive one or more additional I/O requests; and
   issue one or more transactions for each of the I/O requests, wherein transactions for different I/O requests are interleaved.

6. The I/O adapter device of claim 5, wherein the I/O request and the one or more additional I/O requests are directed to different virtual devices, and wherein transactions are issued for different I/O requests according to a priority between the virtual devices.

7. The I/O adapter device of claim 5, wherein the one or more I/O requests are directed to different queues, and wherein the transactions are issued for different I/O requests according to a priority between the queues.

8. The I/O adapter device of claim 5, wherein the I/O request and the one or more additional I/O requests are directed to the same queue.

9. The I/O adapter device of claim 1, wherein the offload pipeline comprises:
   a plurality of streaming components, wherein each streaming component is configured to perform one or more packet processing operations for the I/O adapter device; and
   a streaming interconnect coupled to the plurality of streaming components, the streaming interconnect configured for routing the one or more transactions.

10. The I/O adapter device of claim 1, wherein the offload pipeline comprises one or more of a host interface unit, a parsing and steering unit, a compression/decompression unit, an encryption/decryption unit, a splitter unit, an assembler unit, an network offloads unit, a media access control unit, a payload manager, or a payload buffer.

11. A computer-implemented method, comprising:
   maintaining, by an Input/Output (I/O) adapter device, a plurality of virtual devices, wherein the virtual devices are each operable to receive I/O requests for a host device and issue transactions for those I/O requests;
   receiving, by the I/O adapter device, an I/O request from a virtual machine on the host device, wherein the I/O request is a write request;
   determining, by the I/O adapter device, that the I/O request is larger than a pre-determined size;
   issuing, by the I/O adapter device, one or more transactions, wherein issuing includes generating and transmitting each transaction, wherein the one or more transactions represent the I/O request, wherein a number of the one or more transactions is determined by a size of the I/O request and a pre-determined I/O burst size and write data for the write request is segmented into the one or more transactions;
   receiving responses to each of the one or more transactions; and
   sending a response for the I/O request to the virtual machine, wherein the response for the I/O request indicates that the write request was completed.

12. The computer-implemented method of claim 11, wherein issuing further comprises:
   determining, by the I/O adapter device, that at least one of the one or more transactions is larger than a pre-determined frame size; and
   transmitting one or more frame-size write data segments.

13. An Input/Output (I/O) adapter device comprising:
   a processor comprising one or more processing cores, wherein each processing core is configured to execute a respective plurality of computer-executable instructions; and
   an offload pipeline;
   wherein the I/O adapter device is configured to:
      receive an I/O request from a virtual machine executing on a host device, when the I/O adapter device is coupled to the host device, wherein the I/O request is a read request;

determine that the I/O request is larger than a pre-determined size;

transmit one or more transactions, wherein the one or more transactions represent the I/O request, wherein a number of the one or more transactions is determined by a size of the I/O request and a pre-determined I/O burst size;

receive responses to each of the one or more transactions, wherein the responses to each of the one or more transactions each include a part of read data associated with the read request; and send a response for the I/O request to the virtual machine, wherein the response for the I/O request includes the read data associated with the I/O request.

14. The I/O adapter device of claim 13, wherein the response to each of the one or more transactions include a respective checksum for the read data, and wherein the I/O adapter device is further configured to verify each checksum.

15. The I/O adapter device of claim 13, wherein the I/O adapter device is further configured to:
   determine that at least one of the responses includes a part of the read data that is less than or equal to a pre-determined frame size; and
   receive the at least one response that includes frame-size read data.

16. The I/O adapter device of claim 15, wherein the at least one response that includes the frame-size read data includes a checksum for the frame-size read data, and wherein the I/O adapter device is further configured to verify each checksum.

17. The I/O adapter device of claim 13, wherein the I/O adapter device is further configured to:
   receive one or more additional I/O requests; and
   issue one or more transactions for each of the I/O requests, wherein transactions for different I/O requests are interleaved.

18. The I/O adapter device of claim 17, wherein the I/O request and the one or more additional I/O requests are directed to different virtual devices, and wherein transactions are issued for different I/O requests according to a priority between the virtual devices.

19. The I/O adapter device of claim 17, wherein the one or more I/O requests are directed to different queues, and wherein the transactions are issued for different I/O requests according to a priority between the queues.

20. The I/O adapter device of claim 13, wherein the offload pipeline comprises:
   a plurality of streaming components, wherein each streaming component is configured to perform one or more packet processing operations for the I/O adapter device; and
   a streaming interconnect coupled to the plurality of streaming components, the streaming interconnect configured for routing the one or more transactions.

* * * * *